United States Patent [19]
Moisin et al.

[11] Patent Number: 5,955,841
[45] Date of Patent: Sep. 21, 1999

[54] BALLAST CIRCUIT FOR FLUORESCENT LAMP

[75] Inventors: Mihail Moisin, Lake Forest, Ill.; Mark E. Martich, Hanover, Mass.

[73] Assignee: Pacific Scientific Company, Washington, D.C.

[21] Appl. No.: 08/905,165

[22] Filed: Aug. 1, 1997

Related U.S. Application Data

[63] Continuation of application No. 08/723,289, Sep. 30, 1996, Pat. No. 5,691,606, which is a continuation of application No. 08/316,395, Sep. 30, 1994.

[51] Int. Cl.⁶ .................................................. H05B 31/02
[52] U.S. Cl. ............................... 315/56; 315/58; 315/71; 315/291; 315/307; 315/224; 315/244; 315/219; 315/247
[58] Field of Search ..................................... 315/307, 291, 315/56, 58, 71, 224, 244, 219, 247

[56] References Cited

U.S. PATENT DOCUMENTS

| | | |
|---|---|---|
| 2,505,112 | 4/1950 | Hallman . |
| 2,966,602 | 12/1960 | Waymouth et al. . |
| 3,112,890 | 12/1963 | Snelling . |
| 3,517,259 | 6/1970 | Dotto . |

(List continued on next page.)

FOREIGN PATENT DOCUMENTS

| | | |
|---|---|---|
| 0114370 | 8/1984 | European Pat. Off. . |
| 0127101 | 12/1984 | European Pat. Off. . |
| 0239863 | 10/1987 | European Pat. Off. . |
| 0395776 | 11/1990 | European Pat. Off. . |
| 0441253 | 8/1991 | European Pat. Off. . |
| 3437554 | 4/1986 | Germany . |
| 0259646 | 3/1988 | Germany . |
| 3632272 | 4/1988 | Germany . |
| 3813672 | 11/1988 | Germany . |
| 655042 | 12/1976 | Russian Federation . |
| 9000830 | 1/1990 | WIPO . |
| 9009729 | 8/1990 | WIPO . |
| 9309649 | 5/1993 | WIPO . |
| 94/27420 | 11/1994 | WIPO . |

OTHER PUBLICATIONS

KRöning et al., "New Electronic Control," *Siemens Power Engineering & Automation VIII*, No. 2, pp. 102–104, 1985.

Hayt, et al., *Engineering Circuit Analysis*, 3d ed., pp. 296–297, 1978.

Osram Delux® compact fluorescent lamps, "Economical long–life lighting —with extra convenience of electronic control gear ", pp. 1–15.

Philips Lighting, "Lamp specification and application guide", pp. 1, 11, 61–64, 78.

*Primary Examiner*—Michael B Shingleton
*Attorney, Agent, or Firm*—Knobbe, Martens, Olson & Bear, LLP

[57] ABSTRACT

An improved ballast circuit for use with a compact fluorescent lamp includes an EMI filter, a rectifier and voltage amplification stage, an active resonant circuit and power factor correction stage which is connected in parallel to a lamp load. The ballast circuit includes a feedback capacitor which provides a feedback path for a portion of the high frequency current to the rectifier and voltage amplification stage. The feedback capacitor of the improved ballast circuit reduces the non-linear characteristics of the diode, thus providing almost a linear load on the input power supply and therefore achieving an improved power factor, on the order of 0.95 or greater. The improved ballast circuit may also include a dimming stage which works with the active resonant circuit to vary the amount of power that is supplied to the lamp load. The dimming stage does not require the addition of parasitic active stages and thus provides a lamp with high electrical efficiency.

40 Claims, 14 Drawing Sheets

U.S. PATENT DOCUMENTS

| | | |
|---|---|---|
| 3,569,817 | 3/1971 | Boehringer . |
| 3,611,021 | 10/1971 | Wallace . |
| 3,736,496 | 5/1973 | Lachocki . |
| 3,882,356 | 5/1975 | Stehlin . |
| 3,913,000 | 10/1975 | Cardwell, Jr. . |
| 3,965,345 | 6/1976 | Fordsmand . |
| 3,974,418 | 8/1976 | Fridrich . |
| 4,005,334 | 1/1977 | Andrews . |
| 4,016,451 | 4/1977 | Engel . |
| 4,053,813 | 10/1977 | Kornrumpf et al. . |
| 4,125,767 | 11/1978 | Silver . |
| 4,127,795 | 11/1978 | Knoll . |
| 4,127,798 | 11/1978 | Anderson . |
| 4,135,116 | 1/1979 | Smith . |
| 4,160,288 | 7/1979 | Stuart et al. . |
| 4,168,453 | 9/1979 | Gerhard et al. . |
| 4,230,971 | 10/1980 | Gerhard et al. . |
| 4,237,403 | 12/1980 | Davis . |
| 4,245,285 | 1/1981 | Weiss . |
| 4,277,728 | 7/1981 | Stevens . |
| 4,284,925 | 8/1981 | Bessone et al. . |
| 4,348,615 | 9/1982 | Garrison et al. . |
| 4,350,891 | 9/1982 | Wuerflein . |
| 4,353,009 | 10/1982 | Knoll . |
| 4,370,600 | 1/1983 | Zansky . |
| 4,379,254 | 4/1983 | Hurban . |
| 4,388,563 | 6/1983 | Hyltin . |
| 4,392,087 | 7/1983 | Zansky . |
| 4,393,323 | 7/1983 | Hubner . |
| 4,395,660 | 7/1983 | Waszkiewicz . |
| 4,399,391 | 8/1983 | Hammer et al. . |
| 4,423,348 | 12/1983 | Greiler . |
| 4,443,740 | 4/1984 | Goralnik . |
| 4,481,460 | 11/1984 | Kröning et al. . |
| 4,510,400 | 4/1985 | Kiteley . |
| 4,523,131 | 6/1985 | Zansky . |
| 4,533,986 | 8/1985 | Jones . |
| 4,544,863 | 10/1985 | Hashimoto . |
| 4,547,706 | 10/1985 | Krummel . |
| 4,562,383 | 12/1985 | Kerscher et al. . |
| 4,580,080 | 4/1986 | Smith . |
| 4,612,479 | 9/1986 | Zansky . |
| 4,613,934 | 9/1986 | Pacholok . |
| 4,616,158 | 10/1986 | Krummel et al. . |
| 4,620,271 | 10/1986 | Musil . |
| 4,626,746 | 12/1986 | Zaderej . |
| 4,631,450 | 12/1986 | Lagree et al. . |
| 4,641,061 | 2/1987 | Munson . |
| 4,647,817 | 3/1987 | Fähnrich et al. . |
| 4,651,060 | 3/1987 | Clark . |
| 4,677,345 | 6/1987 | Nilssen . |
| 4,682,083 | 7/1987 | Alley . |
| 4,683,402 | 7/1987 | Aubrey . |
| 4,700,113 | 10/1987 | Stupp et al. . |
| 4,730,147 | 3/1988 | Kroening . |
| 4,739,227 | 4/1988 | Anderson . |
| 4,742,535 | 5/1988 | Hino et al. . |
| 4,743,835 | 5/1988 | Boss″ et al. . |
| 4,857,806 | 8/1989 | Nilssen . |
| 4,859,914 | 8/1989 | Summa . |
| 4,864,482 | 9/1989 | Quazi et al. . |
| 4,894,587 | 1/1990 | Jungreis et al. . |
| 4,933,605 | 6/1990 | Quazi et al. . |
| 4,943,886 | 7/1990 | Quazi et al. . |
| 4,949,020 | 8/1990 | Warren et al. . |
| 4,950,963 | 8/1990 | Sievers . |
| 4,954,768 | 9/1990 | Luchaco et al. . |
| 4,988,921 | 1/1991 | Ratner et al. . |
| 4,996,462 | 2/1991 | Krummel . |
| 4,999,547 | 3/1991 | Ottenstein . |
| 5,001,386 | 3/1991 | Sullivan et al. . |
| 5,003,230 | 3/1991 | Wong et al. . |
| 5,004,959 | 4/1991 | Nilssen . |
| 5,004,972 | 4/1991 | Roth . |
| 5,039,914 | 8/1991 | Szuba . |
| 5,041,763 | 8/1991 | Sullivan et al. . |
| 5,083,081 | 1/1992 | Barrault et al. . |
| 5,084,653 | 1/1992 | Nilssen . |
| 5,089,751 | 2/1992 | Wong et al. . |
| 5,097,181 | 3/1992 | Kakitani . |
| 5,101,142 | 3/1992 | Chatfield . |
| 5,172,033 | 12/1992 | Smits . |
| 5,172,034 | 12/1992 | Brinkerhoff . |
| 5,173,643 | 12/1992 | Sullivan et al. . |
| 5,174,646 | 12/1992 | Siminovitch et al. . |
| 5,175,477 | 12/1992 | Grissom . |
| 5,185,560 | 2/1993 | Nilssen . |
| 5,192,896 | 3/1993 | Qin . |
| 5,194,782 | 3/1993 | Richardson et al. . |
| 5,198,726 | 3/1993 | Van Meurs et al. . |
| 5,214,356 | 5/1993 | Nilssen . |
| 5,233,270 | 8/1993 | Nilssen . |
| 5,237,243 | 8/1993 | Chung . |
| 5,245,253 | 9/1993 | Quazi . |
| 5,289,079 | 2/1994 | Wittman . |
| 5,289,083 | 2/1994 | Quazi . |
| 5,296,783 | 3/1994 | Fischer . |
| 5,309,062 | 5/1994 | Perkins et al. . |
| 5,313,142 | 5/1994 | Wong . |
| 5,321,337 | 6/1994 | Hsu . |
| 5,331,253 | 7/1994 | Counts . |
| 5,341,067 | 8/1994 | Nilssen . |
| 5,363,020 | 11/1994 | Chen et al. . |
| 5,394,064 | 2/1995 | Ranganath et al. . |
| 5,396,154 | 3/1995 | Shiy et al. . |
| 5,396,155 | 3/1995 | Bezdon et al. . |
| 5,404,082 | 4/1995 | Hernandez et al. . |
| 5,434,478 | 7/1995 | Kovalsky et al. . |
| 5,461,287 | 10/1995 | Russell et al. . |
| 5,550,438 | 8/1996 | Reijnaerts . |
| 5,596,247 | 1/1997 | Martich et al. . |

1

BALLAST CIRCUIT FOR FLUORESCENT LAMP

This application is a continuation of U.S. patent application Ser. No. 08/723,289, filed Sep. 30, 1996, now U.S. Pat. No. 5,691,606, which was a file wrapper continuation of U.S. patent application Ser. No. 08/316,395, filed Sep. 30, 1994.

BACKGROUND OF THE INVENTION

1. Field of the Invention

The present invention relates to electric circuits for operating fluorescent lamps, and, more particularly to ballast circuits for compact fluorescent lamps.

2. Description of the Prior Art

Fluorescent lamps are a conventional type of lighting device which are gas charged devices that provide illumination as a result of atomic excitation of low-pressure gas, such as mercury, within a lamp envelope. The excitation of the mercury vapor atoms is provided by means of a pair of arc electrodes mounted within the lamp. In order to properly excite the mercury vapor atoms, the lamp is ignited and operated at a relatively high voltage, and at a relatively constant current. The excited atoms emit invisible ultraviolet radiation. The invisible ultraviolet radiation in turn excites a fluorescent material, e.g., phosphor, that is deposited on an inside surface of the fluorescent lamp envelope, thus converting the invisible ultraviolet radiation to visible light. The fluorescent coating material is selected to emit visible radiation over a wide spectrum of colors and intensities.

As is known to those of skill in the art, a ballast circuit is commonly disposed in electrical communication with the lamp to provide the elevated voltage levels and constant current required for fluorescent illumination. Typical ballast circuits electrically connect the fluorescent lamp to line alternating current and convert this alternating current provided by the power transmission lines to the constant current and voltage levels required by the lamp.

Fluorescent lamps have substantial advantages over conventional incandescent lamps. In particular, the fluorescent lamps are substantially more efficient and typically use 80 to 90% less electrical power than an equivalent light for output incandescent lamps.

For these reasons, these lamps have been widely used in a number of applications, especially in commercial buildings where the unusual shape and size (in contrast to incandescent bulbs) is either not a disadvantage or is actually an advantage.

In view of the significant advantages of the fluorescent tubes, it would seem to be a natural to largely replace use of the incandescent lamp in the home environment, especially now that compact fluorescent tubes are available.

However, to date, these lamps have several serious disadvantages which have limited their use. These disadvantages include:

1. The ballast circuit unlike an incandescent bulb, presents a non-linear load to the A.C. line. Typically the power factor which measures the phase relationship of the current and voltage of a conventional ballast circuit is about 0.4 which is an undesirable level. One prior solution to the ballast circuit problem is to employ an electronic ballast circuit which electrically is more efficient. However, these ballast circuits require a large number of electrical components which increases the cost of the fluorescent lamp. Further, the addition of these electrical components cause harmonic distortion problems and provide a lower than desired power factor.

2. Fluorescent lamps have been relatively large, both because of the lamp itself but also because of the space required to house the ballast circuit. As a result, contemporary fluorescent lamps cannot readily replace many incandescent lamps used in the home and elsewhere.

3. Dimmable fluorescent lamps suffer from a number of compromises. Common problems are flickering and striations, e.g., alternating bands of illumination and non-illumination across the fluorescent lamps, in the dimmed conditions, uneven non-gradual dimming, a small range of dimming, and high cost of the dimming circuit.

4. Conventional ballasts emit unacceptable levels of electromagnetic interference (EMI) and radio-frequency interference (RFI). The high levels of interference often make the fluorescent lamp unacceptable near radios, televisions, personal computers and the like.

5. Although the fluorescent tube itself has a very long life, the ballast, particularly ballasts capable of dimming the fluorescent tube, have suffered from excessive failures in the field. In addition, many dimmable fluorescent lamp ballasts suffer catastrophic failure if the ballast is plugged into line voltage without a fluorescent tube in the circuit.

6. Some prior art ballast circuits require a large ferrite core inductor to be placed between the lamp and the input power circuit to provide a selected degree of electrical isolation between the power transmission lines at the input and the lamp, while allowing the conduction of the necessary current levels to the fluorescent lamp. Despite the fact that these ballast circuits provide the desired current and voltage levels they do so at the price of the electrical efficiency of the ballast circuit.

SUMMARY OF THE INVENTION

The present invention comprises a ballast circuit for a compact fluorescent lamp that has a high electrical efficiency and a high power factor rating. The improved ballast circuit of the present invention preferably comprises an EMI filter, a rectifier and voltage amplification stage, and an active resonant circuit and power factor correction stage which is connected in parallel to a lamp load and a feedback element. In accordance with one aspect of the present invention, the ballast circuit additionally comprises a dimming circuit to enable a full range of variable adjustment of the level of brightness of the fluorescent lamp, i.e., from 0% to 100% light output.

A significant feature of the present invention is that the adverse effects and problems found in the prior art either eliminated or reduced to such low levels as to make the present invention essentially "plug-to-plug" compatible with the incandescent lamp but with all of the attendant advantages of the fluorescent tubes. Thus, as indicated above the power factor typically associated with compact fluorescent lamps of the prior art is in the range of about 0.4–0.6 which is an undesirable level. In the present invention, the power factor correction is much higher, e.g., on the order of 95% or greater. In the preferred embodiment this is achieved by a feedback path for a position of the high frequency current from the lamp's load to the rectifier and voltage amplification stage 1. This feedback path has to be found to substantially compensate for this non-linearities characteristic of the rectifier diodes.

By eliminating the non-linearities of the diodes, the ballast circuit appears as an almost linear load at the input voltage interface, thus achieving the very high level of power factor correction.

In accordance with one aspect of the present invention, the ballast circuit provides a dramatically improved dimming capability. This is achieved by including an improved dimmer control circuit to enable variable adjustment of the level of brightness of the fluorescent lamp. The dimmer control circuit preferably controls the operation of a second switching transistor in the active resonant circuit to suppress the operation of the second switching transistor during a portion of the conductive cycle of the second switching transistor to operate asymmetrically, thus providing a lower average power to the fluorescent lamp to dim its output.

A further significant feature of the dimmable ballast circuit described above is that it requires only one single active stage to perform all the necessary functions of a ballast circuit, including lamp start-up, lamp driving operations, and local dimming of the lamp. The streamlined circuit design also provides for high electrical efficiency of the operating circuit because of the lack of additional parasitic active stages. Further, as indicated above the resonant circuit provides for low total harmonic distortion and for high power factor correction, for example, achieving a power factor of greater than 0.95.

BRIEF DESCRIPTION OF THE DRAWINGS

The foregoing and other objects, features, and advantages of the invention will be apparent from the following description and from the accompanying drawings, in which like reference numerals refer to the same parts throughout the different views.

DETAILED DESCRIPTION OF THE DIFFERENT EMBODIMENTS OF THE INVENTION

The Compact Screw-In Fluorescent Lamp 10

Figure 1:
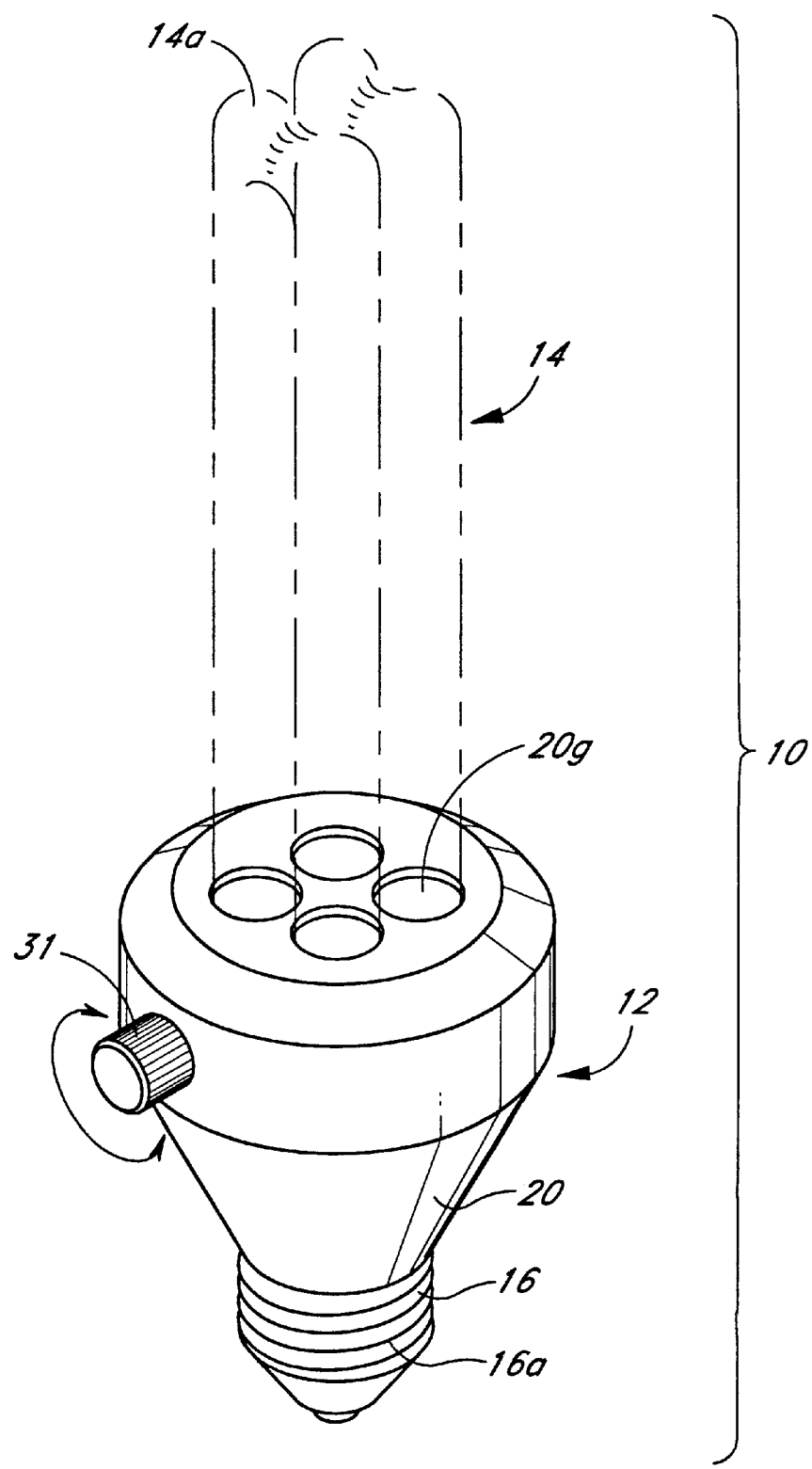
FIG. 1 is a perspective view of a dimmable compact screw-in fluorescent lamp apparatus constructed in accordance with this present invention.
Figure 2:
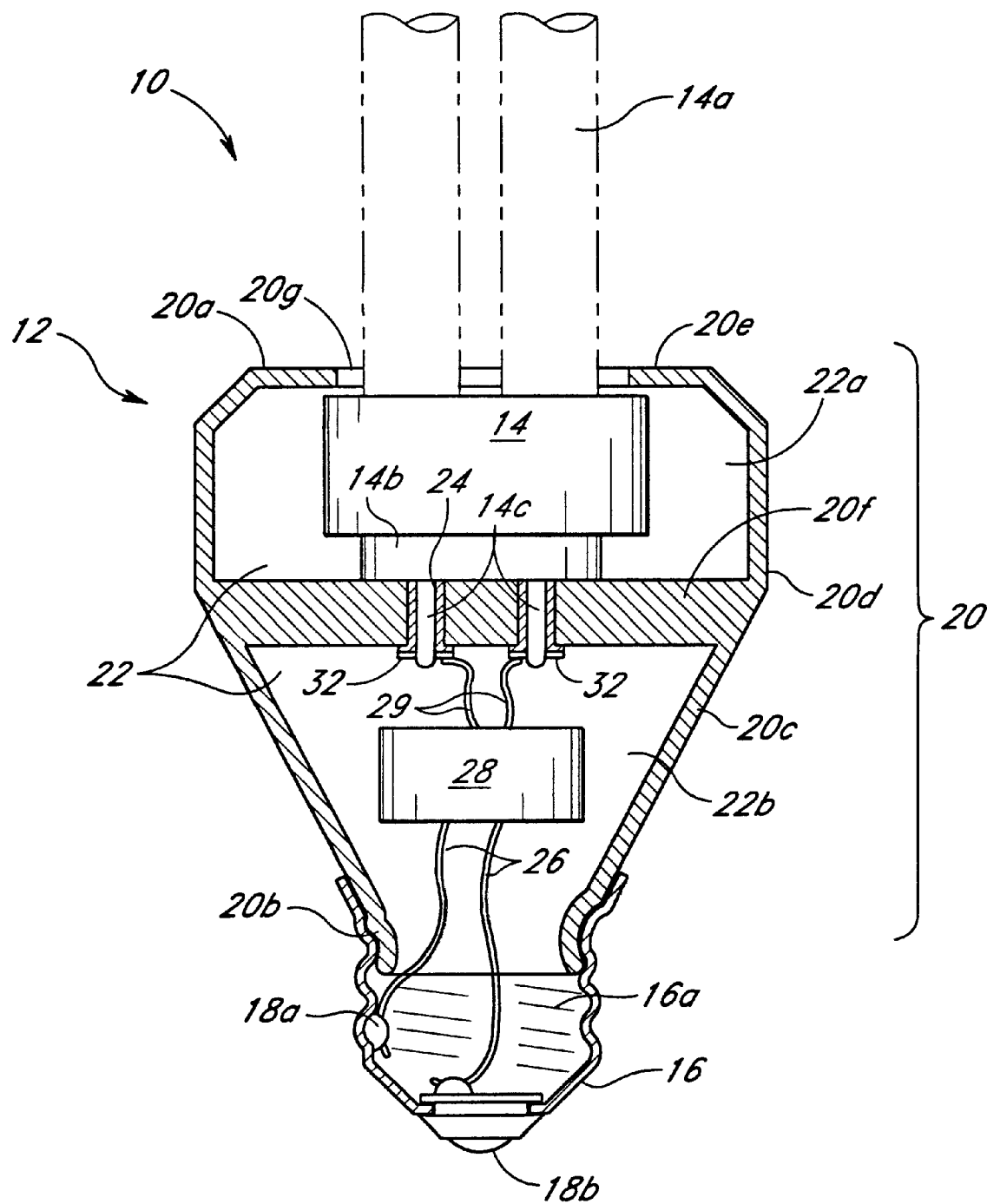
FIG. 2 is a side elevational view, partly in section, of a compact lamp apparatus according to the embodiment in FIG. 1.

Referring to FIGS. 1 and 2, a compact screw-in fluorescent lamp 10 including a lamp base 12 that supports at one end a fluorescent lamp tube element 14. The fluorescent lamp element 14 comprises at least one fluorescent tube 14a, a base portion 14b and electrical contacts 14c. The opposite end of the lamp base 12 supports a conventional electrical screw-in socket 16 which includes threads 16a for threaded engagement with a conventional electrical lamp socket. This electrical socket 16 typically includes two electrical conductors 18a and 18b arranged for electrical connection with the corresponding conductors on the electrical lamp socket. As is conventional for fluorescent lamps, the electrical conductors 18a and 18b are located at the side and the bottom, respectively, of the socket 16.

The base 12 further includes an electrically insulative housing 20 having a top end 20a axially spaced from the bottom end 20b. The illustrated housing 20 has a generally overall conical or triangular shape which is narrow at the bottom end 20b and wider at the top end 20a. The housing 20 includes funnel-like portion 20c above the bottom end 20b and below a cylindrical portion 20d. It will be understood that the housing 20 can have other cross-sectional configurations, such as for example, circular, ellipsoid, rectangular or triangular. The illustrated portion 20d has a cylindrical wall and is bound at the top by flat wall 20e and at the bottom by interior panel 20f which spans the interior space 20 traverse to the longitudinal axis of the housing. The housing 20 thus bounds a hollow interior space 22 partitioned into an upper interior space 22a and a lower interior space 22b by the interior panel 20f. The base 16 is secured to the housing 20 at the bottom end 20b of the housing 20 to form the bottom of the adaptor 12.

The compact fluorescent lamp apparatus further includes a removable and replaceable fluorescent tube illumination element 14. In the embodiment shown, the fluorescent lamp tube element removably and replaceably plugs into a socket-like lamp supporting element comprising interior panel 20f via socket connectors 32. The base portion 14b of the fluorescent lamp tube element 14 seats on the top face of panel 20f and sits within openings 20g in the top wall 20e of the housing 20. Electrical contacts 14c extend through the openings 24 in the panel 20f to removably and replaceably plug into connective socket connectors 32, thereby forming electrical connection between the illumination element 14 and the adaptor 12. In an alternative embodiment not shown, the fluorescent lamp tube element is permanently affixed to the housing 2d so that the entire fixture of FIG. 1 is sold and used as an integral unit.

A circuit housing 28 which contains a ballast circuit 40 of FIG. 3, as described in more detail below, is mounted within the housing 20 illustratively in the lower interior space 22b. Input electrical conductors 26 of the circuit housing 28 connect respectively to the electrical connector 18a and 18b of the socket base 16. The connection of the ballast circuit within the ballast circuit housing 28 applies an excitation current and voltage to the illumination element 14. Output conductors 29 from the ballast circuit housing 28 electrically connect to the electrical contacts 14c of the fluorescent illumination element 14 via the socket connections 32.

Ballast Circuit 40—Simplified Block Diagram

Figure 3:
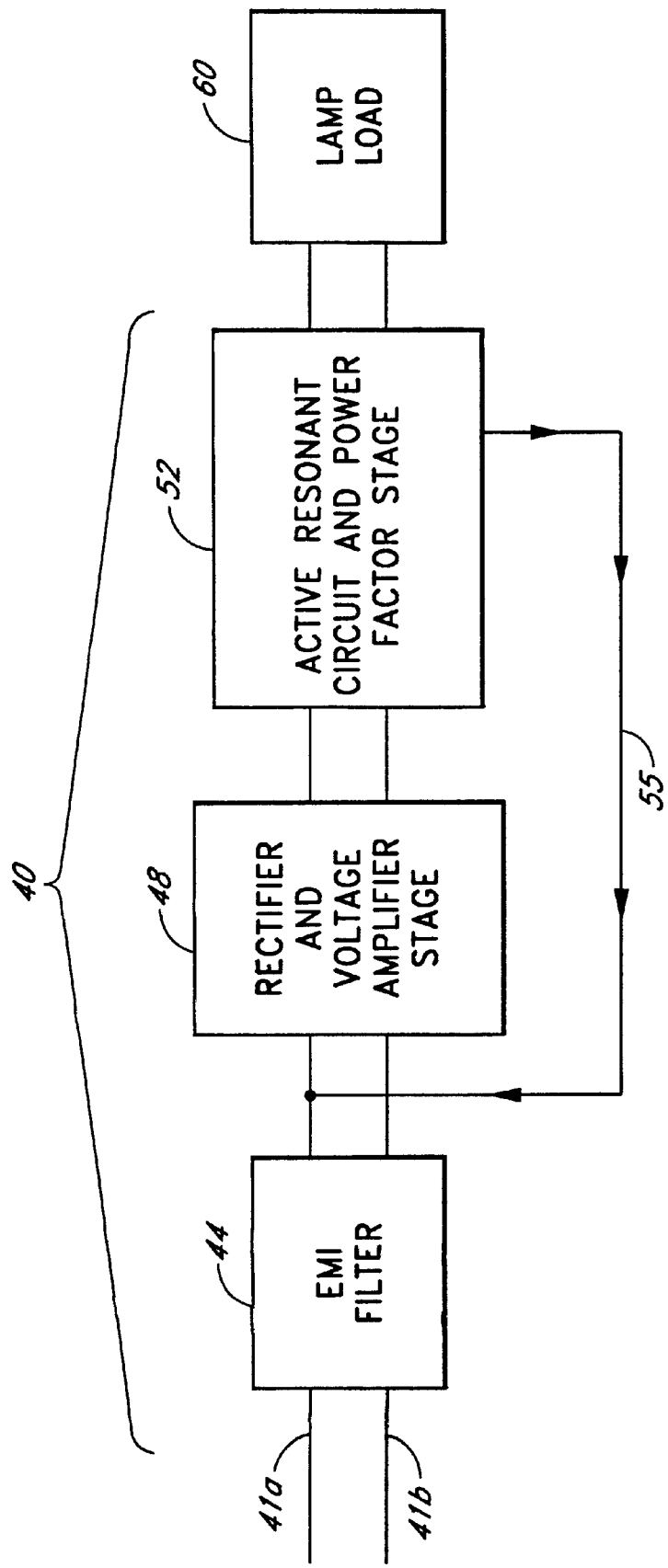
FIG. 3 is a block diagram of a ballast circuit constructed in accordance with this invention for use with the compact lamp apparatus of FIG. 1.

FIG. 3 is a block diagram illustration of a ballast circuit 40 and a fluorescent lamp load 60 in accordance with one embodiment of the present invention. The illustrated ballast circuit 40 is advantageously mounted to provide in the lower interior lamp space 22a preferably within the ballast circuit housing 28 of FIG. 1. The ballast circuit 40 includes an EMI filter stage 44, a rectification and voltage amplification stage 48 and a resonant circuit and power factor correction stage 52, which are connected to a lamp load 60, as shown. The lamp load 60 corresponds to the fluorescent tubes 14a, FIG. 1. The input ac source is connected to the high and low voltage lines 41a and 41b, respectively, which are in turn connected electrically in series with the EMI filter stage 44. The outputs of the EMI filter stage 44 are connected to an input of the rectifier and voltage amplification stage 48. Outputs of the rectifier and voltage amplification stage 48 are connected to respective inputs of the resonant circuit stage 52. The output of the resonant circuit 52 is connected, power wise, in series with the lamp load 60. Further, the resonant circuit 52 generates a high frequency voltage feedback signal on line 55 that is electrically connected to the respective inputs of the voltage amplification stage 48. The ballast circuit 4D has several significant features. The EMI filter stage substantially alternates feedback of electromagnetic interference and the a.c. input line. The line 55 may substantially reduce the non-linearities of the load presented to the a.c. line. As described below with reference to FIG. 4, these and other features provide an entirely practical compact fluorescent lamp which retains all of the advantages of the fluorescent lamp without the significant disadvantages of prior art ballast stages.

Ballast Circuit 40—Detailed Circuit Schematic

Figure 4:
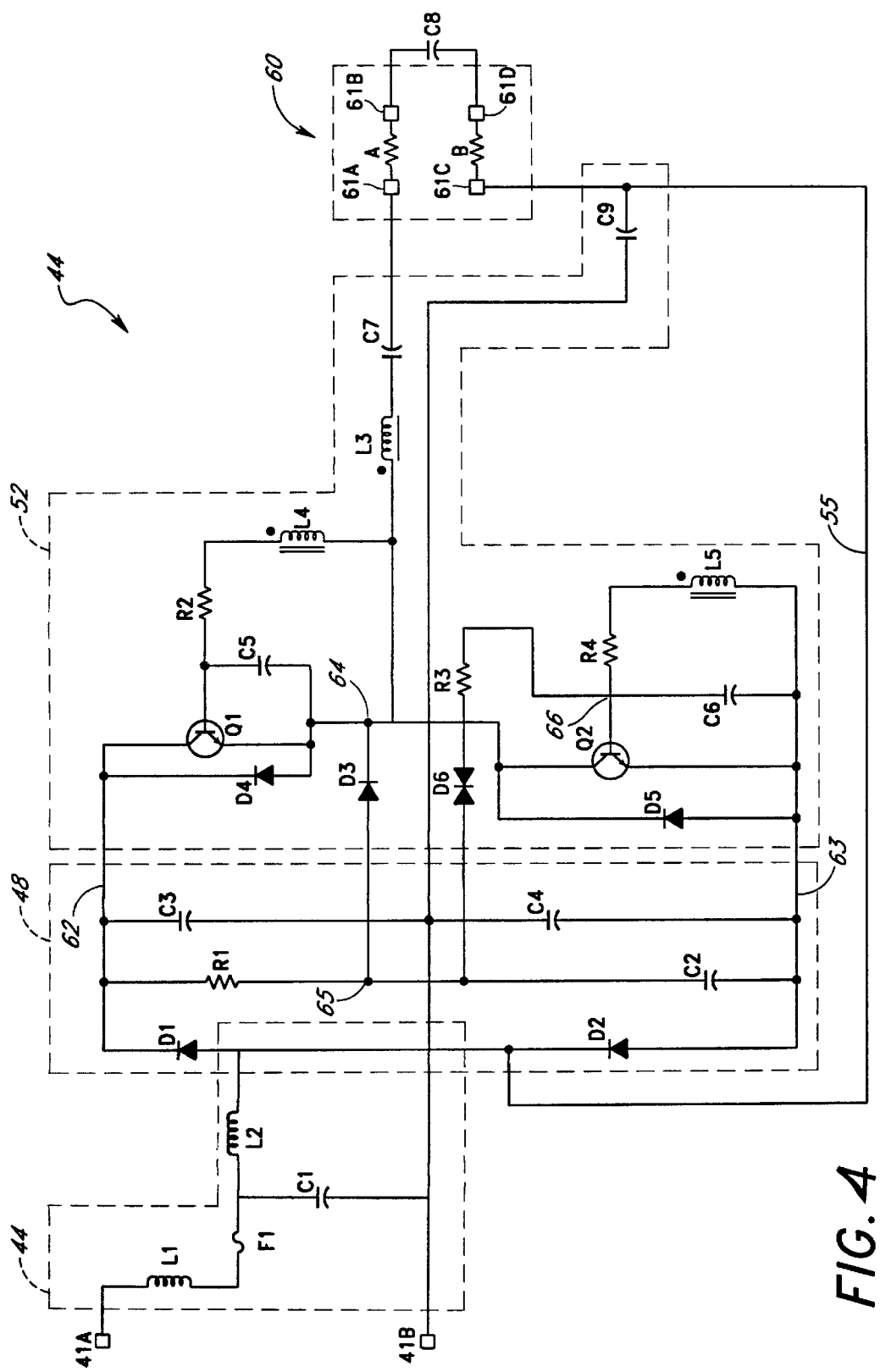
FIG. 4 is a schematic circuit diagram of the ballast circuit of FIG. 3.

FIG. 4 illustrates a detailed circuit schematic of the ballast circuit 40.

EMI Filter Stare 44

The EMI filter stage 44 includes a series inductor L1, a fuse Fl, a parallel capacitor C1 and a high frequency blocking inductor L2. The inductor L1 is connected electrically in series with the fuse F1, which in turn is connected to one end of the parallel capacitor C1. The opposite end of the capacitor C1 is connected to the low voltage input line 41b, also referred to as the neutral rail. The LC filter formed by inductor L1 and capacitor C1 ensure a smooth input waveform to the voltage amplification stage 48 by preventing interference with other electronic devices, as is known in the art. The coupled series inductor L2 prevents leakage of unwanted high frequency interference back into the power transmission lines. The fuse F1 protects the ballast circuit 40 and lamp load 60 from damage due to over currents from the input power lines.

In a specific embodiment, the components of the EMI filter stage have the following values: the series inductor L1 is approximately 2.7 mH, the fuse F1 is approximately a 1 Amp fuse, the parallel capacitor C1 is approximately 0.16 $\mu$F and the high frequency blocking inductor L2 is approximately 4.7 mH.

The Rectification and Voltage Amplification Stage 48

Stage 48 converts the input A/C voltage to a D/C voltage and amplifies the magnitude of this DC voltage to the level necessary to start or ignite the fluorescent lamp level and includes a pair of rectifying diodes D1 and D2, current limiting resistor R1, and storage capacitors C3 and C4. The anode of diode D1 is connected to one end of the high frequency blocking inductor L2 and to the cathode of diode D2. The cathode of diode D1 is connected to one end of resistor R1 and to the charging end of capacitor C3. The opposite end of the capacitor C3 is connected to the neutral rail 41b. The anode of diode D2 is connected to one end of storage capacitor C4, the opposite charging end of which is connected to the neutral rail 41b. The diodes D1 and D2 selectively allow the storage capacitors C3, C4 to charge during portions of each cycle of the 60 cycle sinusoidal input voltage. For example, diode D1 allows capacitor C3 to charge at the peak voltage of the positive half cycle of the input voltage, and diode D2 allows capacitor C4 to charge at the peak voltage of the negative half cycle. As described below, during this start-up phase, the sum of the voltage across C3 and C4 are supplied in a series circuit to the fluorescent lamps load. The voltage amplification performed by the illustrated amplification stage is 2:1 and is sufficient to start the fluorescent lamp.

In a specific embodiment, the components of the rectification and voltage amplification stage 48 have the following values: the rectifying diodes D1 and D2 are preferably UF4005 diodes, the current limiting resistor R1 is approximately 470 K$\Omega$ and is rated at ¼ watt, and storage capacitors C3 and C4 are approximately 15 $\mu$F.

The Active High Frequency Resonant Stage 52

Stage 52 comprises a diode D3, a pair of switching transistors Q1 and Q2, each having a collector emitter and base, free wheeling diodes D4 and D5, and a pair of reverse-breakdown voltage capacitors C5 and C6. Each of the free wheeling diodes D4 and D5, respectively, are connected between the collector and emitter of switching transistors Q1 and Q2, respectively. The resonant stage 52 further comprises transistor driving resistors R2 and R4, a primary inductor L3, which is associated with secondary inductors L4 and L5, a DC blocking capacitor C7, and a voltage feedback capacitor C9. The inductors L4 and L5 are advantageously provided by different windings on the core of primary inductor L3. Inductors L3, L4 and L5 are advantageously provided by an E core on which is wound the primary winding for L3 and the secondary windings for L4 and L5. Thus, inductor L3 is magnetically coupled to both inductors L4 and L5. The inductors L4 and L5 are oppositely poled and thus are driven out of phase relative to each other. More specifically, L4 generates the driving voltage for transistor Q1 during the positive half cycle of the input voltage, and inductor L5 generates the driving voltage for transistor Q2 during the negative half cycle. The free wheeling diodes D4, D5 provide a current path for the dissipation of magnetic energy stored in the coupled inductors L4 and L5 when transistors Q1 and Q2, respectively, are turned off. The resonant stage 52 is further connected electrically in series with the lamp load 60 that includes output connections 61a, 61b, 61c and 61d, and a lamp striking capacitor C8 which is also referred to as a "resonating storage capacitor". Preferably, a lamp filament element A is connected between connections 61a and 61b, and a lamp filament element B is connected between connections 61c and 61d.

The collector of transistor Q1 is electrically connected to a circuit junction 62, and the emitter is connected to circuit junction 64. The breakdown capacitor C5 is electrically connected between the base and emitter of transistor Q1. The driving resistor R2 is connected at one end to the inductor L4 and at another end to the base of transmitter Q1. The anode of diode D3 is connected to circuit junction 65, and the cathode is connected to circuit junction 64, and is electrically in series with the series combination of the inductor L3 and the DC blocking capacitor C7. One end of capacitor C7 is connected to the output connection 61a of the lamp load 60. The resonating storage capacitor C8 is electrically connected between the circuit connection 61b and 61d. The charging end of the feedback storage capacitor C9 is connected to the neutral rail 41b and the opposite end of the capacitor C9 is connected to the lamp connection 61c and to an input of the rectifier and voltage amplifier stage 48 via feedback path 55.

The collector of transistor Q2 is electrically connected to circuit junction 64 and the emitter is electrically connected to circuit junction 63. The breakdown capacitor C6 is connected between the base and emitter of transistor Q2. The base of transistor Q2 is electrically connected in series with driving resistor R4, the opposite end of which is connected to one end of inductor L5. The opposite end of the inductor L5 is connected to circuit junction 63.

In a specific embodiment, the components of the resonating stage 52 have the following values: the transistors Q1 and Q2 are BUL45 transistors, each having a collector emitter and base, diode D3 is a UF4005 diode, the free wheeling diodes D4 and D5 are UF4005 diodes, the reverse-breakdown voltage capacitors C5 and C6 are approximately 0.1 $\mu$F, the transistor driving resistors R2 is approximately 66 $\Omega$ and is rated at ½ watt, the transistor driving resistors R4 is approximately 56 $\Omega$ is rated at ½ watt, the primary inductor L3 is a 4.0 mH inductor having 200 turns, which is associated with secondary inductors L4 having 3 turns and L5 having 3 turns, the DC blocking capacitor C7 is 0.15 $\mu$F, and the voltage feedback capacitor C9 is 0.0027 $\mu$F.

Starter Circuit and Start Mode of Operation

Capacitor C2, diac D6 and current limiting resistor R3 form a starter circuit that initially, at the application of power to the ballast circuit 40, actuates or turns ON the circuit transistor Q2 in the active resonant stage 52. The current limiting resistor R1 is further connected at one end to the storage capacitor C2, the diac D6 and an anode of a current blocking diode D3 at circuit junction 65. An opposite end of the storage capacitor C2 is connected to the anode of diode D2, the diac D6, and the current limiting resistor R3.

In a specific embodiment, the components of the starter circuit have the following values: the capacitor C2 is approximately 0.1 $\mu$F, diac D6 is an approximately 32 volt diac and current limiting resistor R3 is approximately 330 $\Omega$ and is rated at ¼ watt.

During the start mode of the active resonant stage 52, the switching transistor Q2 is actuated by the starter circuit. Specifically, when capacitor C2 charges to a voltage greater than the reverse breakdown voltage of the diac D6, the diac D6 discharges through the current limiting resistor R3, turning ON transistor Q2. Once transistor Q2 is turned on, the switching transistors Q1 and Q2 alternately conduct during each half cycle of the input voltage and are driven during normal circuit operation by energy stored in the inductor L3 and transferred to the secondary windings of L4 and L5. Therefore, the starter circuit only operates during initial start mode and is not required during the normal operation of the resonant stage 52.

Resonant Mode of Operation

With further reference to FIG. 4, during normal or resonant operation, the ballast circuit 40 is energized by the application of the sinusoidal input voltage having a selected magnitude and frequency to the input power lines 41a and 41b. In the typical embodiment, the input power has a magnitude of 120 volts and a frequency of 60 hertz. The input voltage is filtered by the EMI filter stage 44, as described above, and produces an input current flow to the voltage and rectification circuit 48. During each positive half cycle, current flows through the series combination of diode D1, transistor Q1, inductor L3 and capacitors C7, C8 and C9. During each negative half cycle, current flows through diode D2, capacitor C2, transistor Q2 and capacitors C7, C8 and C9. During normal operation, capacitor C2 discharges through diode D3 after each negative cycle of the input voltage. Concomitantly, each storage capacitor C3 and C4 charges during the peak portion of each corresponding half cycle, and discharges during the other half cycle. For example, capacitor C3 charges during the positive half cycle of the input line voltage, and discharges through the neutral rail 41b during the negative half cycle, while capacitor C4 charges during the negative half cycle of the input line voltage, and discharges through the neutral rail 41b during the positive half cycle.

The inductor L3 stores energy along with the capacitors C7, C8 and C9, forming a series resonant circuit. These components produce a current having a selected elevated frequency, preferably greater than 20 kilohertz, and most preferably around 40 kilohertz, during normal operation of the ballast circuit. This high-frequency operation reduces hum and other electrical noises delivered to the lamp load. Additionally, high-frequency operation of the lamp load reduces the occurrence of annoying flickering of the lamp.

The resonating storage capacitor C8 stores a selected elevated voltage, preferably equal to or greater than 300 volts rms, which is required to start or ignite the fluorescent lamps mounted at the lamp connection 61a to 61d. Once the lamps are struck, the circuit operating voltage is reduced to a value slightly greater than the input voltage, preferably around 100 volts rms, which is maintained by the feedback capacitor C9, also referred to as the storage and feedback capacitor.

Improved Power Factor

A significant feature of this invention is that the power factor of the ballast is substantially improved over the prior art. Thus, a typical series resonant circuit provides for a poor power factor because the input appears very distorted and non-linear due to the effects of the storage capacitors and the rectification diodes. In a typical series resonant circuit, the rectification diodes are only turned ON during the periods of the peak voltages of the positive and negative cycles of the input A/C. Generally, the charging capacitor C3 charges up to its peak voltage during the positive input cycle and then dissipates during the negative input cycle causing the diode D1 to only turn ON during the peak dissipation period of the capacitor C3, i.e., the negative portion of the input cycle. Generally, the charging capacitor C4 charges up to its peak voltage during the negative input cycle and then dissipates during the positive input cycle causing the diode D2 to only turn ON during the peak dissipation period of the capacitor C4, i.e., the positive portion of the input cycle. This results in an input of varying current spikes at these peak periods which is not desired.

In the present invention, the feedback capacitor C9 feeds back a selected high frequency voltage level to the input of the voltage amplification stage 48. The capacitor C9 divides a high frequency feedback current from the lamp load between the neutral rail and the input of the rectification circuit. In addition, C9 operates as a DC blocking capacitor for preventing the passage of unwanted DC voltage along the neutral rail 41B. This high frequency feedback current supplied by the feedback capacitor C9, when applied to the diodes at the input of the rectification circuit 48 expands the conduction angle of the diodes D1 and D2. The expansion of the conduction angle of the diodes D1 and D2 essentially forces the rectification diodes D1 and D2 to conduct during substantially the entire portion of their respective positive and negative half cycles. Therefore, the high frequency feedback current substantially eliminates the non-linear characteristic of the diodes, by causing them to conduct even during the low frequency current periods of each of the positive and negative half cycles. By eliminating the non-linearities of the diodes, the ballast circuit appears as an almost linear load at the input voltage interface, i.e., a power factor of 95% or greater, thus achieving a very high level of power factor correction to the series resonant circuit.

The value of the feedback capacitor C9 determines the amount of the high frequency current that is feedback to the rectification circuit to achieve the desired power factor correction and the amount that is dissipated through the neutral rail. The larger the value of the capacitor C9 the lesser the amount of current that is feedback to the rectification circuit and visa versa. Therefore, in order to achieve the desired amount of power factor correction at the input of the rectification circuit, the feedback capacitor C9 has a value of between about 0.0047 $\mu$F and about 0.02 $\mu$F. In a specific circuit the feedback capacitor used is a polypropylene capacitor having a value of 0.01 $\mu$F with a tolerance of about ±5%. With a voltage drop across the capacitor C9 preferably in the range of or greater than the input voltage, i.e., approximately 100 volts rms. Further, the capacitor preferably has a low power dissipation factor on the order of about 0.1%.

The ballast circuit 40 of the present invention achieves a power factor in the range of 0.95, by employing the feedback topology of the present invention which is a significant improvement over the power factor of 0.4 which was common in prior art ballast circuits. The feedback capacitor C9 also significantly reduces the total harmonic distortion of the lamp by dampening amplified higher order frequency harmonics present in the ballast circuit from the uncorrected input voltage.

Further Advantages of the Circuit of FIG. 4

Typically, series resonant circuits tend to amplify higher order harmonics, since the series resonant capacitor resonates with the inductance of the power line inductor creating a ringing affect that amplifies these higher order harmonics. The high frequency voltage, supplied by the feedback capacitor C9, modulates the amplitude of the low frequency input voltage and harmonizes the phases of the resonant circuit current and the input current. Further, the modulation of the amplitude of the low frequency input voltage functions as a carrier to transport the high frequency current over substantially the entire low frequency cycle, e.g., 60 hertz. Therefore, connecting the feedback capacitor C9 to the input of the voltage amplification stage 48 also significantly improves the total harmonic distortion. As is known, the feedback, or active power factor correction, capacitor C9 insures a relatively clean, e.g., correct sinusoidal input voltage waveform suitable for operating one or more fluorescent lamps. Correcting distortions of the input voltage waveform protects the lamp from damage by transient signal perturbations as well as control current distortions that arise from the non-corrected input voltage.

Another advantage of the resonant circuit 52 of the present invention is that it only requires a single linear inductor to control the switching of the resonant circuit and to limit the current that is applied to the lamp load. Resonant circuits of the prior art utilized either a combination of a saturation transformer to control the switching of the resonant circuit and a linear transformer to limit the current to the lamp load or two linear transformers one to control the switching of the resonant circuit and one to limit the current to the lamp load.

Compact Dimmable Fluorescent Lamp

Figure 5:
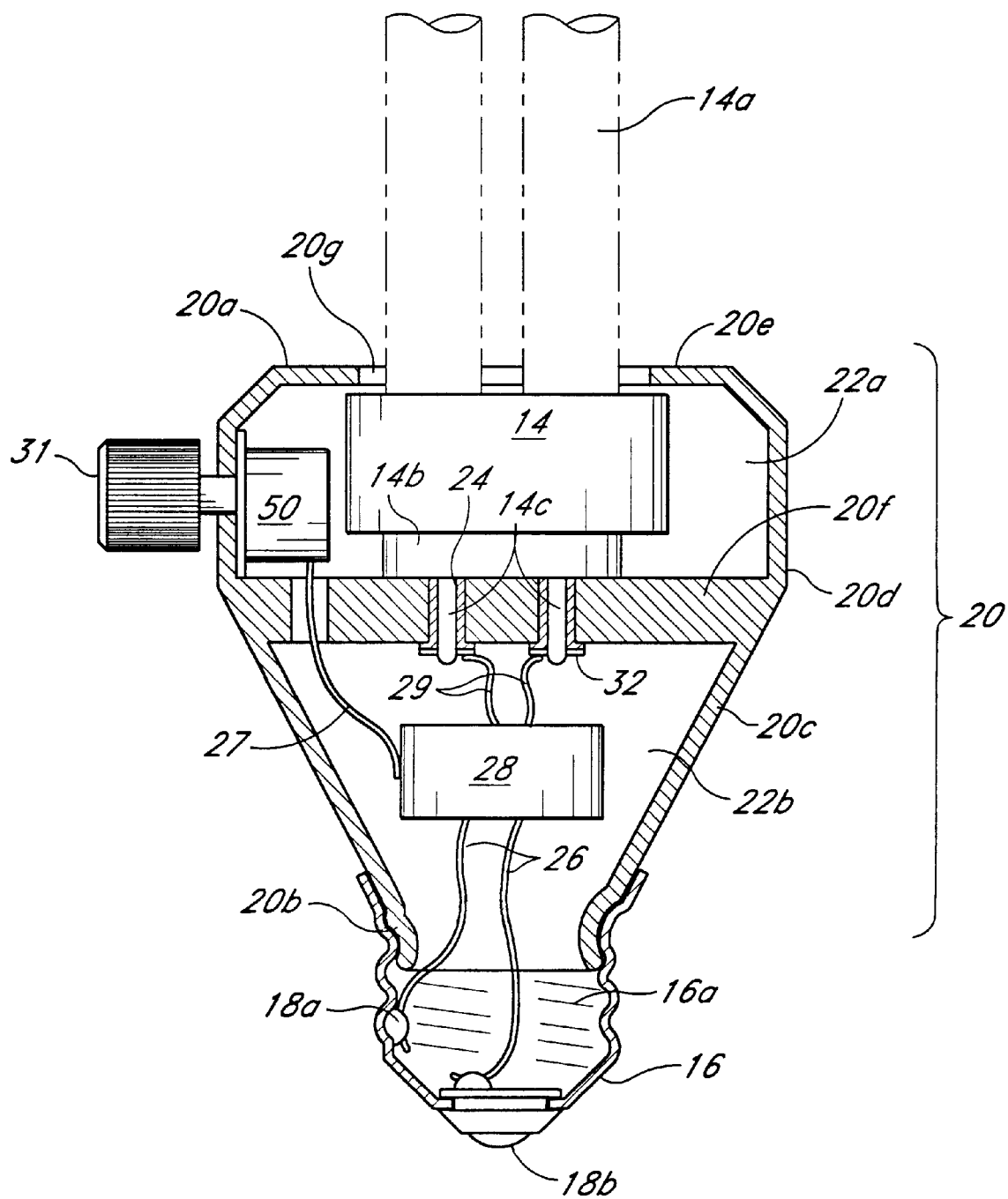
FIG. 5 is a side elevational view partly in section of a dimmable compact screw-in fluorescent lamp apparatus constructed in accordance with this invention.

FIG. 5 illustrates a compact dimmable fluorescent lamp 10 which is similar to the compact lamp illustrated in FIGS. 1 and 2 and includes a dimming capacity. The lamp 10 further comprises an electrical adjustment element 30, such as a variable resister, which has a manually adjustable knob 31. The adjustment element 30, which electrically connects with a dimmable ballast circuit 49 within the ballast circuit housing 28 via a conductor 27, produces a controllable electrical signal in response to adjustment of the position of adjustment element 30. The adjustable knob 31 is preferably manually accessible on the exterior of the tubular portion 20d of the housing 20.

The illustrated adjustable knob 31 is rotatable about an axis transverse to the longitudinal housing axis. A preferred electrical adjustment element 30 includes, for example, a plurality of gears within the housing 20 which engaged with a shaft of the electrical adjustment element 30 and with the shaft of a variable resistor.

Figure 6:
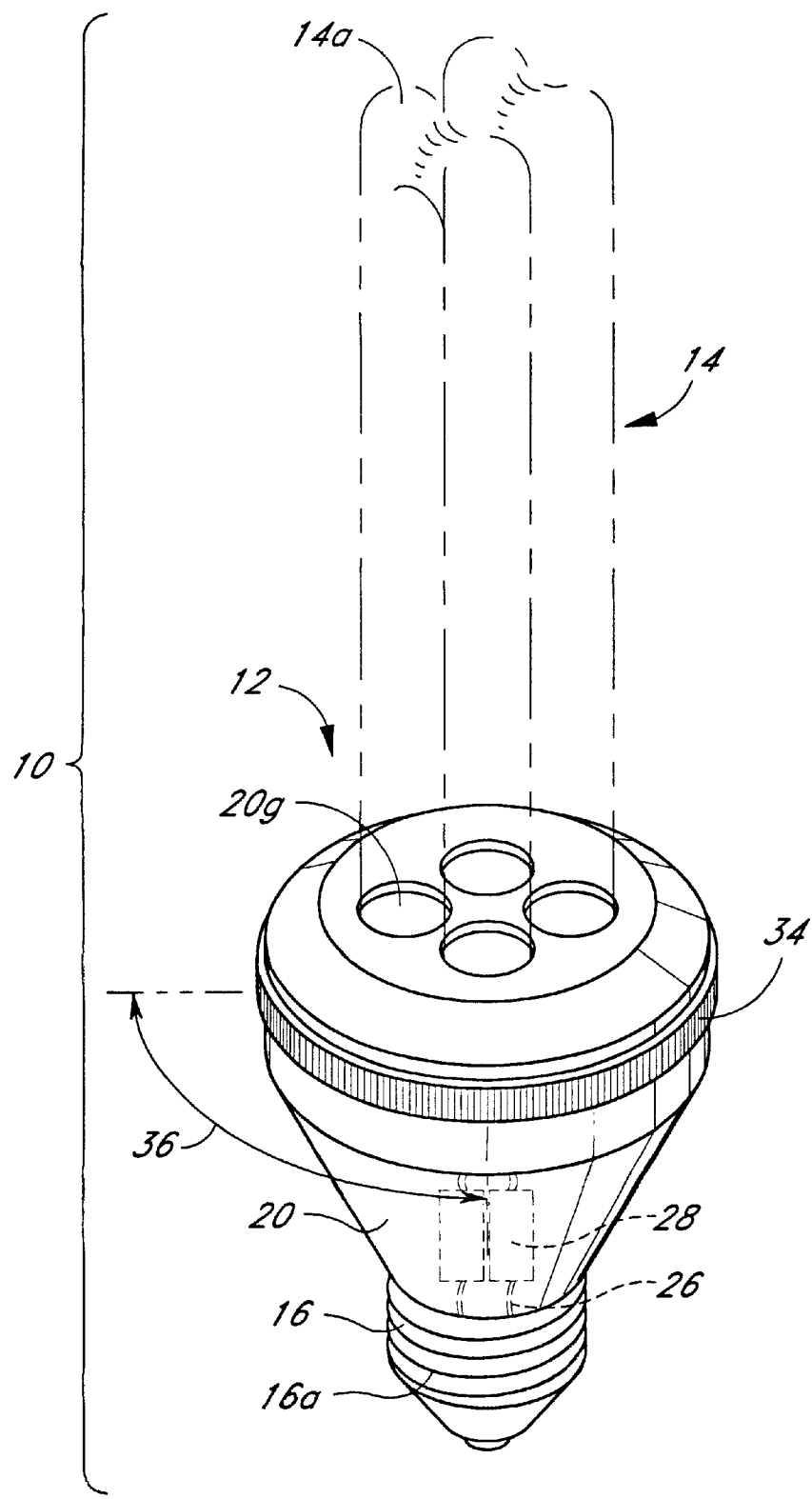
FIG. 6 is a perspective view of a dimmable compact screw-in fluorescent lamp apparatus according to an alternate embodiment of the invention.

In one alternate embodiment as illustrated in FIG. 6, the lamp apparatus is similar to the lamp apparatus of FIG. 5 except that the adjustable knob 31 on the adapter 12 is replaced with a dimmer control 34 that extends about at least a part of an outer circumference of the housing. The dimmer control 34 is rotatable moveable to the housing 20 about the housing's longitudinal axis, as indicated with an arrow 36 extending along the direction of the rotational movement round the circumference of the housing 20. The dimmer control 34 is mechanically linked to the adjustment element 30 within the housing 20 in a manner similar to that previously described in relation to knob 31. The illustrated dimmer control 34 encircles the housing tubular portion 20d to be accessible from any direction for manual adjustment. The dimmer control 34 electrically connects to the dimmable ballast circuit 49 within the ballast circuit housing 28, and manual circumferential movement of the dimmer control 34 varies the light output of the lamp to the desired brightness.

Figure 7:
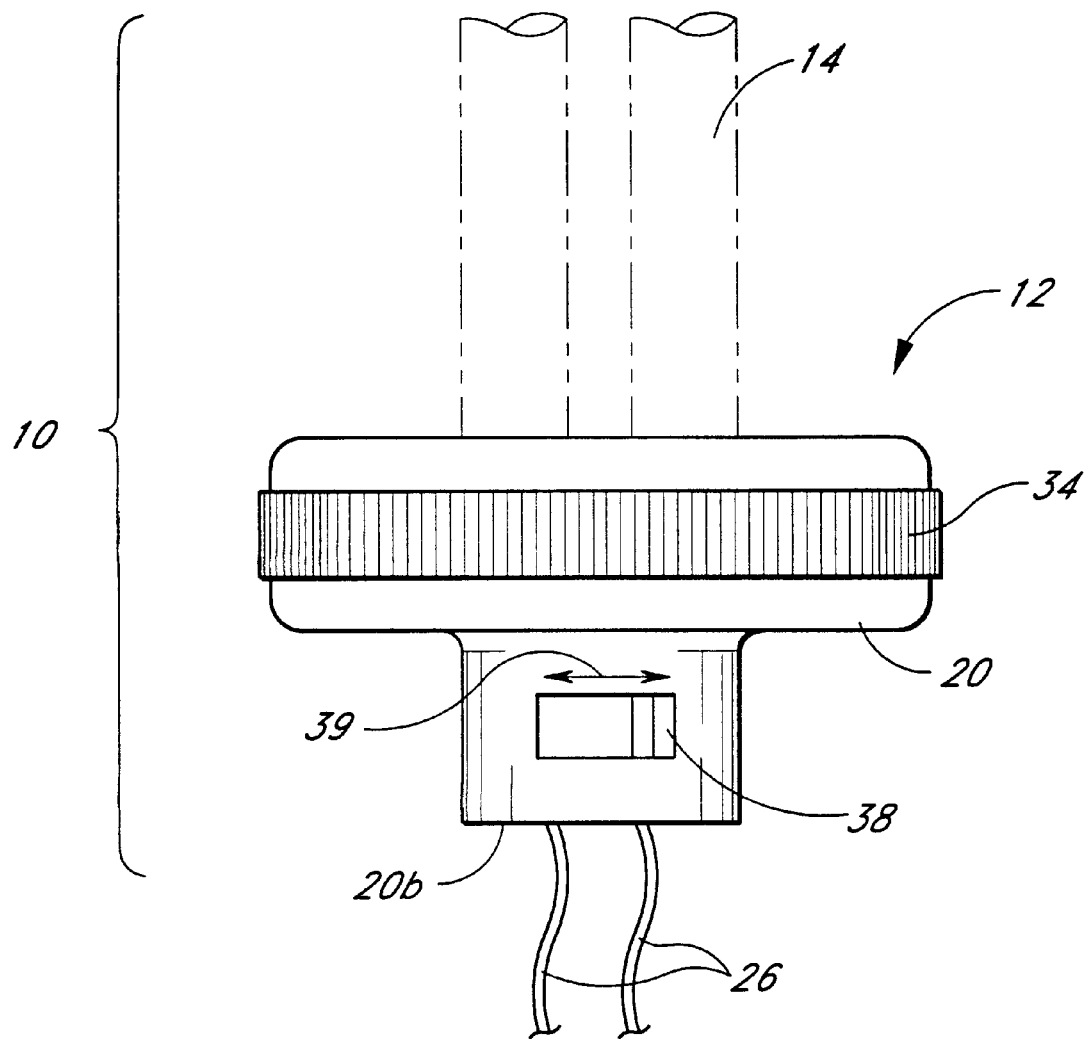
FIG. 7 is a perspective view of a dimmable compact fluorescent screw-in lamp apparatus according to another alternate embodiment of the invention.

In another alternate embodiment of the lamp apparatus as illustrated in FIG. 7, the lamp apparatus is similar to the lamp apparatus of FIG. 6 except that the adaptor 12 includes a switch 38 manually positionable and manually accessible external to the housing. The illustrated switch 38 is moveable between discreet positions relative to the housing 20, as indicated with an arrow 39. The switch 38 is connected to the dimmable ballast circuit 49 within the ballast circuit housing 28, FIG. 6, within the housing 20 and links with the input source of electrical power through electrical conductors 26, which can be directly wired to an electrical fixture for permanent installation of the lamp.

Placement of the switch 38 in one position enables current to flow from the electrical power source through the conductors 26 to the dimmable ballast circuit 49 within its housing 28, FIG. 6, thereby energizing the illumination element 14 and commencing operation of the lamp. Manual adjustment of the dimmer control 34 varies the light output as previously describes. Placement of the switch 38 in another position terminates current flow to the control circuit, thereby ceasing lamp operation.

Figure 8:
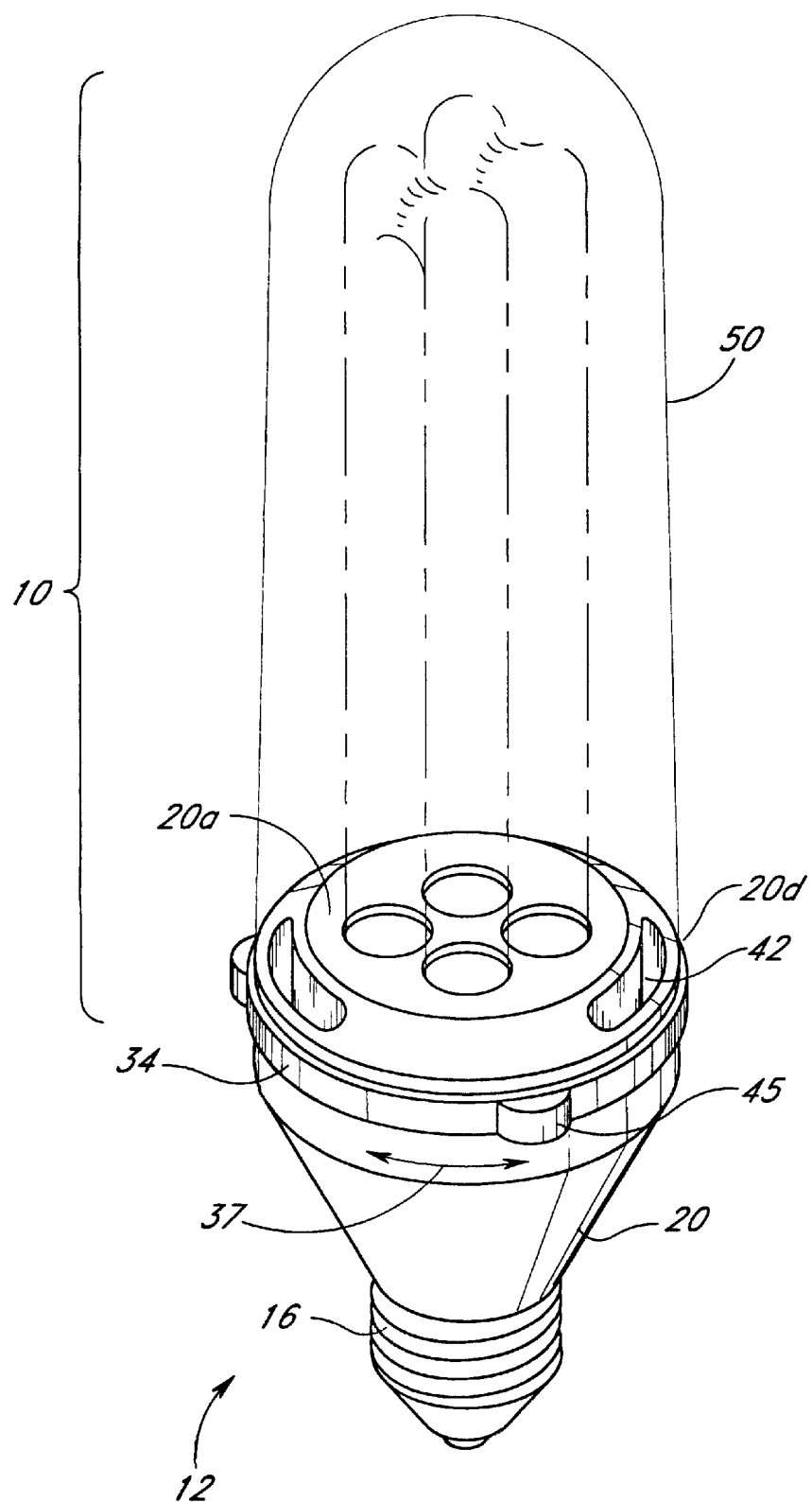
FIG. 8 is a perspective view of a dimmable compact fluorescent screw-in lamp apparatus according to a further alternate embodiment of the invention.
Figure 9:
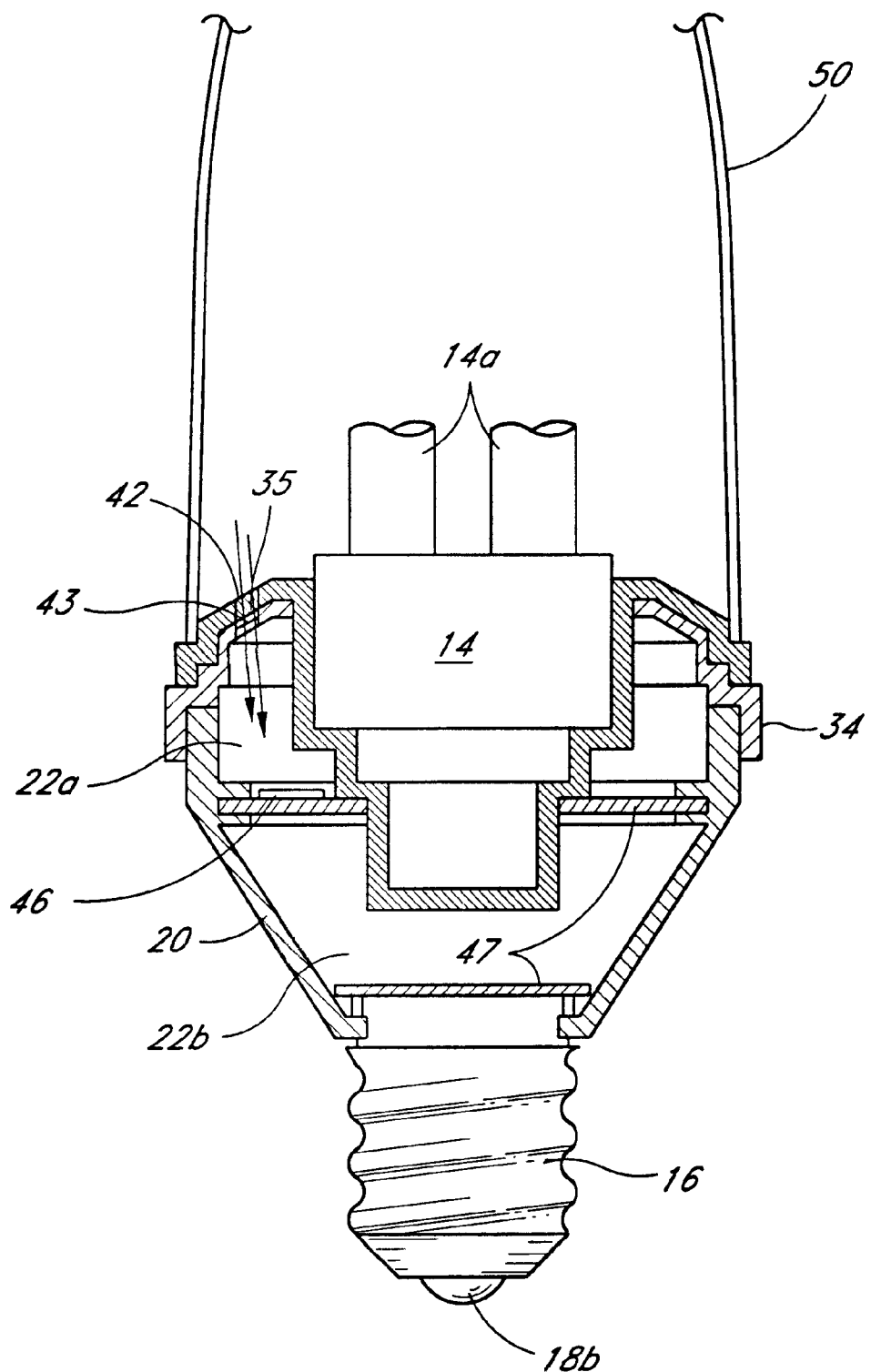
FIG. 9 is a partial sectional view of the embodiment of the dimmable compact fluorescent screw-in lamp apparatus illustrated in FIG. 8.

In another alternate embodiment of the lamp apparatus as illustrated in FIGS. 8 and 9, the lamp apparatus is substantially similar to the lamp apparatus of FIG. 6 except that the housing 20 includes one or more apertures 42. The apertures 42 permit entry of light from ambient surroundings, including other illumination sources and from the operation of the fluorescent illumination element 14, into the housing 20. The dimmable ballast circuit 49 within the housing 28, FIG. 6, of this embodiment preferably includes one or more light sensing elements 46 which can be mounted on a circuit board 47. The dimmable ballast circuit 49 within the circuit housing 28, FIG. 6, is preferably located in the lower space 22b of the housing 20 and can also be mounted on the circuit board 47.

The housing 20 preferably includes a plurality of apertures 42 which are preferably positioned at or near the top end 20a of the housing 20 and arranged around the periphery of the housing. The apertures 42 can also be located in the housing tubular portion 20d. The number and location of the light sensing elements 46 within the housing determines, at least in part, the number and placement of the apertures 42 in the housing 20.

The apertures 42 preferably have protective panes 43 which protect the components inside the housing 20 from the environment outside the lamp apparatus 10, such as moisture and dust. The protective panes 43 are preferably made of a thin, optically transparent or translucent material, such as glass or plastic, although other types of optical filters can be used. It may be desirable, for example, to use plastic film as the protective panes 43 to darken or otherwise filter the light sensed by the light sensing elements 46 in the adaptor 12. The protective pads 43 can be located adjacent to and above and/or below the apertures 42 and can be affixed to the housing 20 according to methods known to those of skill in the art.

The light sensing element 46 is preferably a photosensitive control element, such as, for example, a photocell or a phototransistor. Preferably, the number of light sensing elements 46 equals the number of apertures 42, and it is further preferred to arrange the light sensing elements 46 to be directly below the apertures 42 so that the light sensing elements 46 receive light entering the housing through the apertures 42. In a preferred embodiment, the lamp apparatus 10 includes a plurality of light sensing elements 46 placed around the periphery of the adapter 12 directly beneath the apertures 42.

The housing 20 further includes an optical adjustment element 34 which is manually accessible on the outside of the adaptor 12 and is movable relative to the housing about the longitudinal axis, as indicated with an arrow 37 extending along the direction of rotational movement. The optical adjustment element 34 is illustrated as a ring member with manually accessible knobs or protuberances 45. The optical block passage of light to the light sensing elements 46 within the housing 20. The aperture occluders 35 can be disposed within the housing 20, as shown in FIG. 7, or they can be located outside of the housing, or they can be located on the ring member itself. Preferably, the aperture occluders 35 are integrally formed with the ring member and extend axially from the ring member to shield the apertures from incoming light. The integrally formed aperture occluders preferably extend axially from the ring member below the aperture 42 and the light sensing element 46, as shown in FIG. 7. Movement of the optical adjustment element 34 around the periphery of the housing 20 causes movement of the aperture occluder 35 across the aperture 42, as shown in FIG. 6.

The lamp apparatus 10 shown in FIG. 6 can further includes an optically transparent or translucent dome 50 which fits snugly with the adaptor 12 and protects the fluorescent illumination elements 14 and the apertures 42 from dirt, moisture, shock and the like. The dome 50 can be made of, for example, glass or plastic. If the apertures 42 are located on the top end 20a of the housing, the dome 50 can be used to cover and protect the entire top portion of the housing 20, thereby possibly eliminating the need for separate protective panes 43 in the apertures 42. However, if the apertures 42 are located elsewhere on the housing, protective panes 43 are preferably used to isolate the components within the adapter housing 20 from the environment outside the adapter.

Operation of the lamp 10 is similar to the operation of the lamp 10 previously described. Manual positioning of the optical adjustment element 34 determines the position of the aperture occluders 35 with respect to the apertures 42. The dimmable ballast circuit 49 within the circuit housing 28 can be designed to turn the lamp ON in response to either an absence of light or the presence of light at the light sensing elements 46. In one embodiment of the invention, when the aperture occluders 35 completely cover the apertures 42, no ambient light nor light from the fluorescent illumination element 14 can enter the housing and impinge on the light sensing element 46. Thus, there is no electrical signal generated by the light sensing element 46 to the dimmable ballast circuit 49 within the circuit housing 28, and the dimmable ballast circuit 49 within the circuit housing 28 turns the lamp on. When the aperture occluders 35 are adjusted to partially block the apertures 42, some ambient light and/or light from the fluorescent illumination element impinges on the light sensing element 46. A proportional electrical signal is thus generated by the light sensing element, thus driving the dimmable ballast circuit 49 within the circuit housing 28 to dim the lamp. When the aperture occluders are positioned so as not to block any portion of the apertures 42, any ambient light and/or light from the fluorescent illumination element can enter the aperture and impinge on the light sensing element 46 within the adapter. A maximum electrical signal is generated by the light sensing element 46, thus causing the dimmable ballast circuit 49 within the circuit housing 28 to turn the lamp off.

In an alternative embodiment, complete blockage of the apertures 42 by the aperture occluders 35 can cause the dimmable ballast circuit 49 within the circuit housing 28 to turn the lamp off. Conversely, positioning the aperture occluders 35 so that they do not block the apertures can cause the dimmable ballast circuit 49 within the circuit housing 28 to turn the lamp on.

Dimming and brightening of the lamp are thus easily and conveniently achieved by manual positioning of the optical adjustment element 34 on the outside of the lamp.

The lamps thus described in association with FIGS. 5–9 provide dimmable and brightenable fluorescent light with manual adjustment of the knob 31 or the dimmer control 34 on the housing of the lamp. With the electrical connection of the lamp 10 to an electrical power source, the illumination element 14 provides variable fluorescent light output according to the position of the adjustable knob element 30, or dimmer control 34, either of which is electrically connected to the dimmable ballast circuit 49 within the circuit housing 28.

Block Diagram of the Preferred Embodiment of the Improved Ballast

Figure 10:
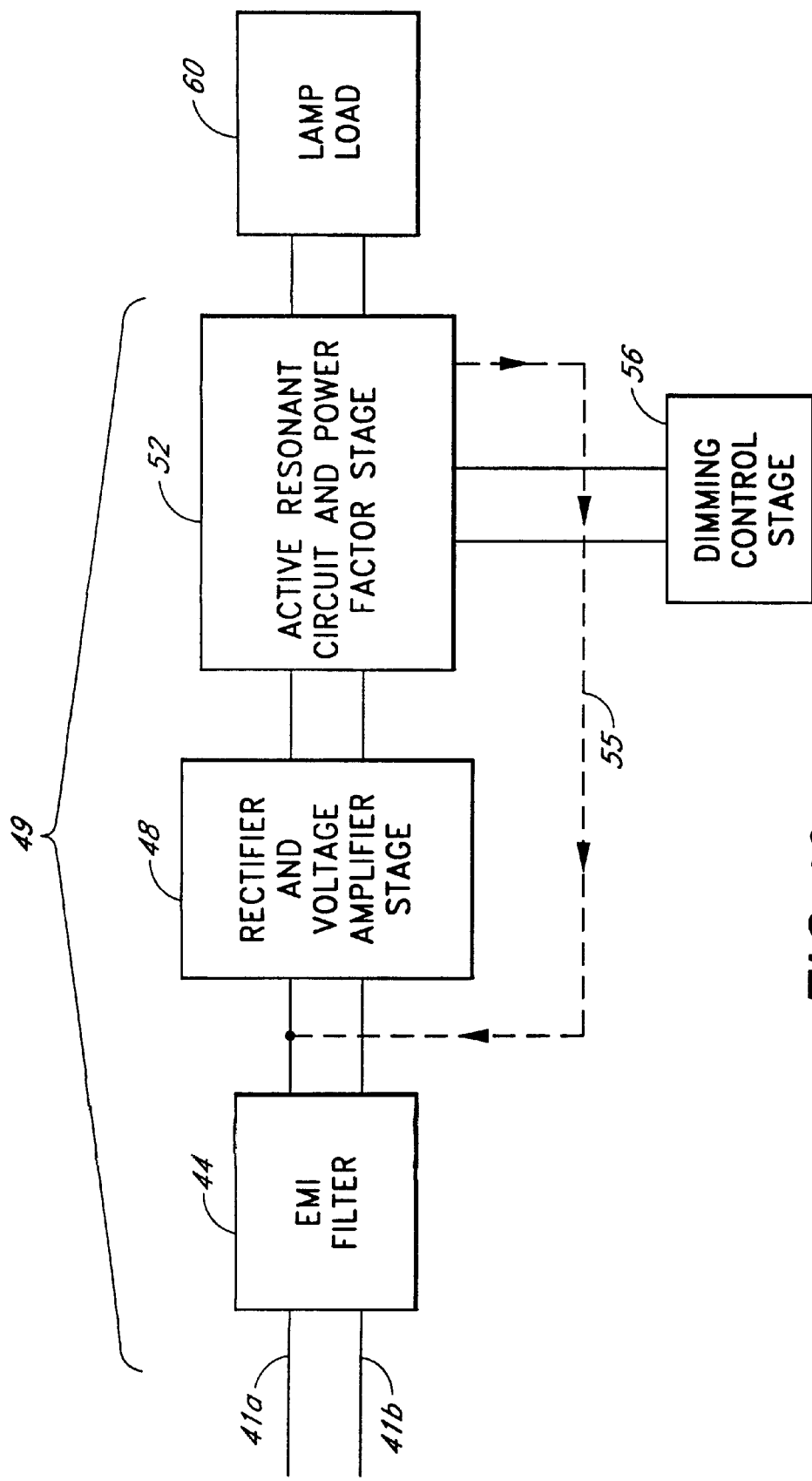
FIG. 10 is a block diagram of a dimmable ballast circuit constructed in accordance with this invention for use with the compact lamp apparatus of FIGS. 5, 6, 7, 8 and 9.

FIG. 10 is a block diagram of a fluorescent lamp and dimmable ballast circuit 49 in accordance with one aspect of the present invention. The illustrated dimmable ballast circuit 49 comprises similar elements to the ballast circuit 40 illustrated in FIG. 3, such as an EMI filter stage 44, a rectification and voltage amplification stage 48, an active resonant circuit and power factor correction stage 52 and a lamp load 60, connected as shown. The dimmable ballast circuit 49 also includes a dimmable control stage 56 which is connected in parallel to the active resonant circuit and power factor stage 52. The dimming stage 56 is electrically connected to the resonant circuit and power factor stage 52 and produces an output dimming signal for varying the current supplied to the lamp load 60 by the resonant circuit 52 as described in greater detail below.

Circuit Schematic of the Preferred Embodiment of the Ballast

Figure 11:
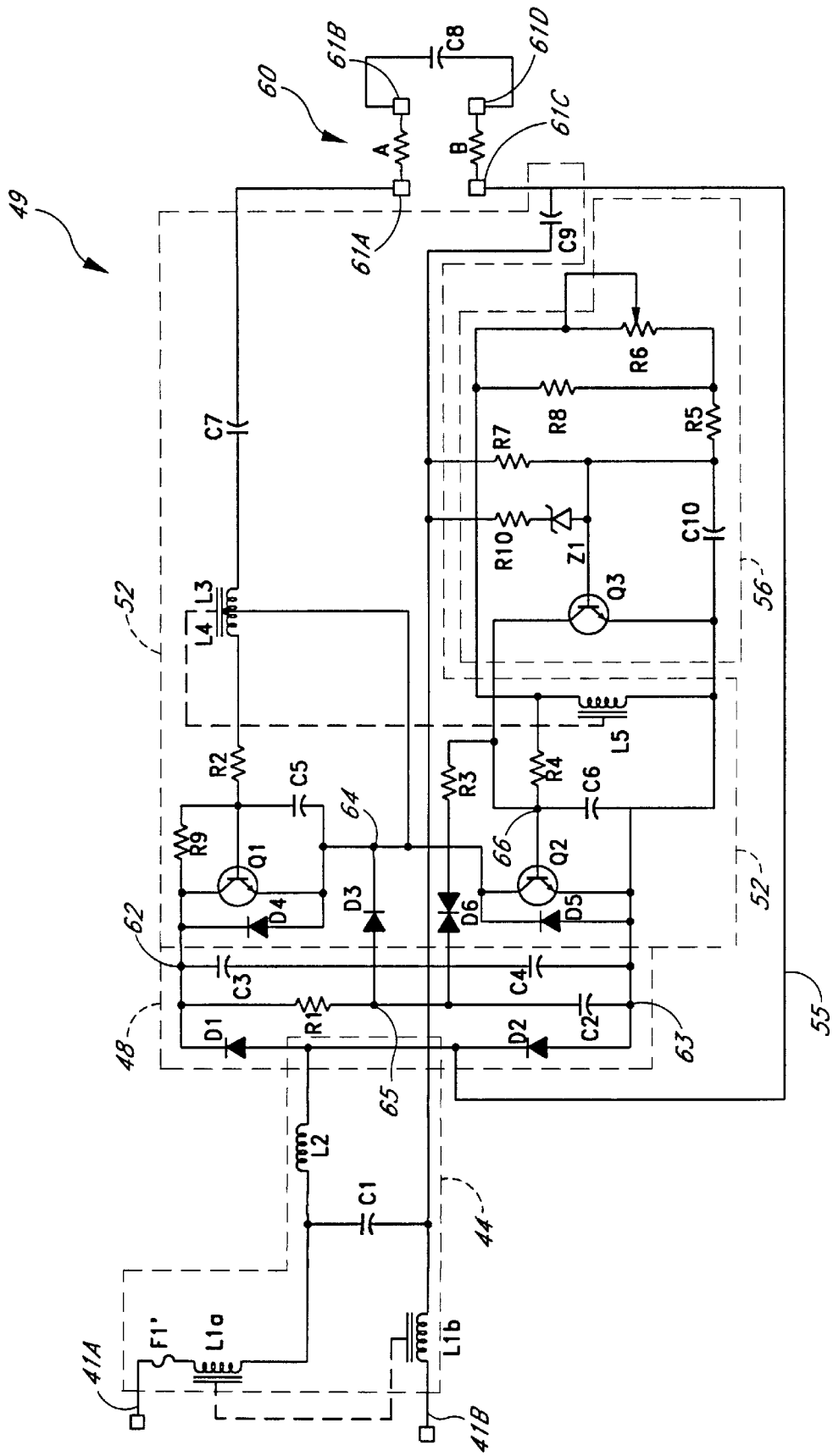
FIG. 11 is a schematic circuit diagram of the dimmable ballast circuit of FIG. 10.

FIG. 11 illustrates a dimmable ballast circuit in accordance with one aspect of the present invention. The dimmable ballast circuit 49 operates in a similar manner as the ballast circuit 40 described in association with FIGS. 3 and 4. EMI filter stage 44 relocates the fuse F1' in series with the line input 41A and inductor L1a. In the specific circuit, fuse F1' is advantageously formed as a fusible link on the printed circuit. Inductor L1 includes L1a and L2b, respectively, connected to both sides of the line voltage so as to buffer both lines for protecting the line against EMI. Advantageously, both L1a and L1b are magnetically coupled and are provided by two windings on a single core. Also, in the specific embodiment, a resistor R9 of 1 meg ohm is connected between the collector and base of transistor Q1.

The dimming feature is provided by the addition of the dimming stage 56. The dimming stage 56 includes a transistor Q3, storage capacitor C10, resistor R5, variable resistor R6, and zener diode Z1. Although shown as part of a resonant circuit 52, those of ordinary skill in the art will recognize that the transistor driving resistor R4 and the inductor L5 can be included in the dimming stage 56. A collector of transistor Q3 is electrically connected to circuit junction 66. An emitter of transistor Q3 is electrically connected to one end of inductor L5, one end of capacitor C6, and one end of capacitor C10. The opposite end of capacitor C10 is connected to the base of transistor Q3 and one end of resistor R5. The opposite end of resistor R5 is connected to one end of the variable resistor R6. The opposite end of the variable resistor R6 is connected to one end of resistor R4, and the zener diode Z1 is connected electrically and parallel with the variable resistor R6. The capacitor C10 and the resistor R5 form an RC circuit that preferably has a time constant between about 1 microsecond and about 6 microseconds.

In a specific embodiment, the components of the dimming stage 56 have the following values: the transistor Q3 is a 2N3904 transistor, the storage capacitor C10 is approximately 0.01 µF, the resistor R5 is approximately 1 KΩ and is rated at ¼ watt, the variable resistor R6 is approximately 2 KΩ and is rated at ¼ watt, and zener diode Z1 is an IN5281 zener diode. A resistor R8 of 10 KΩ is located parallel with variable resistor R6.

The illustrated dimming stage 56 adjusts the level of lamp illumination by turning OFF transistor Q2 for selected portions of the voltage half cycle in which the transistor Q2 would normally be turned ON, i.e., conducting. In a preferred embodiment, the conduction state of transistor Q3 controls the conduction state of transistor Q2. Specifically, when transistor Q3 conducts, transistor Q2 turns OFF and, conversely, when transistor Q3 is turned OFF, transistor Q2 conducts.

The variable resistor R6 controls the conduction state of transistor Q3 by varying the voltage drop across capacitor C10. According to one embodiment, when the dimming stage total dimming resistance, defined as the cumulative resistance of resistor R5 and variable resistor R6, is relatively high, referred to as a minimum dimming condition, the voltage drop across capacitor C10 is insufficient to turn ON transistor Q3. During these conditions, transistor Q2 continues to conduct uninterruptedly during its normal conduction portion of the resonant circuit, and maximum current is supplied to the lamp load 60 to produce maximum lamp illumination. When the total dimming resistance is relatively low, the voltage drop across capacitor C10 increases and turns ON transistor Q3, which then prematurely turns OFF transistor Q2 during some selected portion of the resonant circuit cycle. When Q2 turns off, the resonant circuit automatically switches to the Q1 conduction portion of the resonant circuit. The total dimming resistance can be varied by manually adjusting the variable resistor R6 to define a lower or higher resistance for minimum dimming or maximum dimming, respectively. Specifically, the total dimming resistance as defined by the variable resistor R6 and resistor R5 determines the specific portion of the resonant circuit cycle in which transistor Q2 conducts. This, in turn, determines the amount of the lamp driving current that is applied to the load, and thus determines the lamp illumination level.

Current Waveforms

Figure 12:
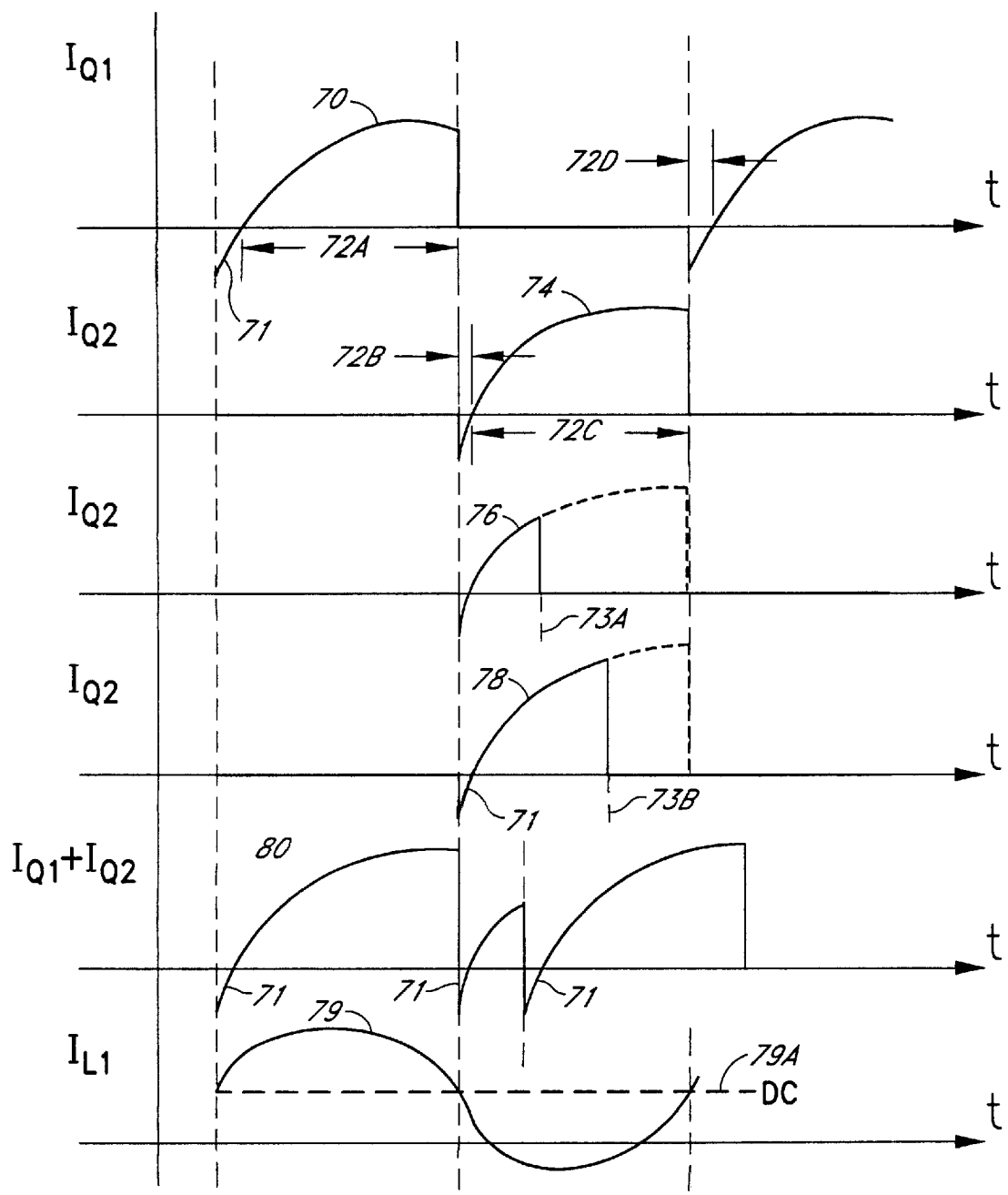
FIG. 12 graphically illustrates selected current waveforms of FIG. 11.

FIG. 12 illustrates the theoretical current waveform at the collectors of transistors Q1 and Q2 during operation of the dimming circuit 56. The dashed lines represent each half cycle of the input circuit AC current and are provided to illustrate the operation of the transistors during the resonant circuit cycle. Waveform 70 shows the theoretical collector current of transistor Q1 during normal operation of the ballast circuit 49. The transistor collector current is substantially identical during both dimming and non-dimming conditions since the conduction of transistor Q1 is substantially unchanged during its normal conduction interval. Likewise, waveform 74 shows the theoretical current through the collector of transistor Q2. As shown, transistors Q1 and Q2 conduct during opposite half cycle portions of the sinusoidal circuit current. The negative current values shown as triangular downward spikes, denote the period when both transistors Q1 and Q2 are turned off. However, each free-wheeling diode D4 and D5 conducts current when its respective transistor is turned off, thus maintaining a circuit pathway for the flow of the coupled inductive current during this time period. As shown in the illustrated waveform 70 and 74, the sequence of current flow through the transistors Q1 and Q2 and the free-flowing diodes D4 and D5 is as follows: Current flows from the emitter of transistor Q1 for a selected period 72A; current flows through the free-wheeling diode D4 for a selected period 72B with transistor Q1 turned off; current flows from the emitter of transistor Q2 for a selected period 72C; and finally current flows through the free-wheeling diode D5 for a selected period 72D with transistor Q2 turned off.

Waveforms 76 and 78 show that conduction of transistor Q3 prematurely turns OFF transistor Q2 for selected portions of its normal conduction interval. Waveform 76 shows the current waveform of transistor Q2 with its conduction interval interrupted at a first selected location 73A. Similarly, waveform 78 shows the current waveform of transistor Q2 with its normal conduction interval interrupted at a second selection location 73B.

A representative combined circuit waveform 80 of transistors Q1 and Q2 with a normal conduction interval of transistor Q2 prematurely terminated illustrates that the duty cycle of the sinusoidal circuit is adjusted variably by the variable resistor R6. When the Q2 transistor is forced OFF, the Q1 transistor turns ON and begins its portion of the resonant cycle. After the Q1 transistor completes its portion of the cycle, the Q2 transistor will turn ON for its suppressed portion of the cycle and then will switch back to the Q1 portion of the cycle. The compression of the resonant cycle by the suppression of the Q2 transistor therefore increases the frequency of the resonant cycle by causing the operation of the Q1 and Q2 transistors to switch back and forth more frequently. The shifted current waveform produces an additional DC circuit component in the ballast circuit during operation. For example, the current waveform 79 of inductor L1 shows the alternating current passing through the inductors during dimming. The compressed conduction cycle of the transistors Q1 and Q2 produces a vertical shift in the current waveform which corresponds to an additional DC current component 79A. This DC current component 79A is filtered from the resonant circuit by the DC blocking capacitor C7. The excess charge that develops across capacitor C7 reduces overall operating voltage of the ballast circuit and thus reduces the level of current supplied to the lamp. Consequently, the resistor R6 controls the relative level of lamp brightness.

Avoidance of Striation and Flickering Problems

The dimmable ballast circuits of the prior art suffered from striation problems and flickering problems, because the dimmable ballast circuits were not capable of properly driving the lamp load during certain dimming conditions, i.e, insufficient power was being supplied to the filaments. The dimmable ballast circuit 49 of the present invention dims the lamp by reducing the current delivered to the lamps, however at the same time the voltage delivered to the lamps by the resonating storage capacitor C8 is increased, therefore the power to the filaments is maintained at a proper driving level. During full power, the filament voltage is approximately 2.2 volts. During a 20% dimming condition, the filament voltage increases to approximately 6.5 volts.

Referring also to FIG. 11, there are two features of the lamp circuit which enable the increased voltage buildup at the resonating storage capacitor C8. As described above, the first reason for the increased voltage at the filaments is that the overall DC voltage of the resonating circuit increases and therefore the voltage applied to the filaments is increased. The second reason is that the shrinking conduction time of the Q2 transistor during dimming conditions increases the frequency of the resonating circuit. The increased frequency of the resonating circuit causes the capacitor C8 to have a lower impedance. The lower impedance of the capacitor C8 enables an increase in the current through the capacitor which increases the overall power applied to the filament.

Further, by maintaining the power delivered to the filament at a preferred driving power range, the dimmable ballast circuit 49 of the present invention is capable of properly driving the lamp filament over a wider dimming range without having the flickering and striation problems associated with prior art dimmable fluorescent lamps.

Delay Circuit

A delay circuit is connected to the base of transistor Q3. This delay circuit comprises a zener diode D7 in series with a resistor R6, and this series circuit in parallel with a much higher resistor R7. The zener diode Z1 ensures proper start-up operation of the fluorescent lamp by forcing the ballast circuit 49 to initially operate in maximum dimming conditions, e.g., minimum total dimming resistance. This condition exposes the fluorescent lamp filaments to an appropriately high voltage level. During start-up operations, the voltage amplification forces the zener diode Z1 to operate in its reverse breakdown region, thus temporarily bypassing the resistor R7 and maintaining a voltage drop across capacitor C10 sufficient to cause Q3 to remain on and Q2 to remain off. Consequently, the dimming circuit 56 operates during start-up for maximum dimming, regardless of the position of the variable resistor R6. This topology allows the ballast circuit to accumulate high voltage levels across the lamp filaments and at the resonating storage capacitor C8, for subsequent striking of the lamp. Once the lamp is struck and the ballast circuit operates at the substantially reduced circuit running voltage, the zener diode Z1 stops conducting, and the high resistor R7 is again electrically associated with the dimming circuit.

Advantages of the Ballast Circuit of FIG. 11

The ballast circuits of the prior art, both dimmable and non-dimmable, required a larger number of components than the dimmable ballast circuit of the present invention. The large number of components in the prior art ballast circuits resulted in a low power efficiency of the circuit. Further, the additional components lowered the overall reliability of the circuit. Finally, the larger number of components caused difficulties in the manufacturing of the circuit.

A significant feature of the ballast circuit of the present invention is that it requires only one single active stage to perform all the necessary functions of a ballast circuit, including lamp start-up, lamp driving operations, and local dimming of the lamp. The streamlined circuit design of FIG. 11 also provides for high electrical efficiency of the operating circuit because of the lack of additional parasitic active stages. In addition, as discussed above, the illustrated resonant circuit provides for low total harmonic distortion and for high power factor correction, for example, achieving a power factor of 0.95 or greater.

By only requiring one active stage, the ballast circuit of the present invention emits less electromagnetic interference (EMI) and radio-frequency interference (RFI) than prior art fluorescent lamp ballast circuits. The prior art ballast circuits has at least two actives stages which operated at different frequencies. The noise caused by the independent active stages operating at different frequencies combines to form a large level of noise which has several different components which are hard to separate and filter out. The ballast circuit of the present invention has only one active stage and therefore produces noise at only one frequency and at a significantly lower level than the multiple active stage ballast circuits of the prior art. By only having a ballast circuit with only one active stage, the EMI filter stage 44 is able to filter the electromagnetic interference (EMI) to an acceptable level. Further, by having only one frequency of noise produced by the single active stage of the ballast circuit, the radio-frequency interference (RFI) can be kept at an lower more acceptable level.

The lower component count of the compact ballast circuit of the present invention reduces the reliability and manufacturing problems common in prior art dimmable ballast circuits. In addition, by lowering the active component count, the power dissipation across the dimmable ballast circuit of the present invention is significantly lower than in ballast circuits of the prior art. The lowered powered dissipation of the dimmable ballast circuit causes a lower ambient temperature in the ballast circuit housing 28. The lower ambient temperature reduces the long term stress on the components of the ballast circuit and increases the overall reliability of the circuit.

Many prior art ballast dimmer circuits can suffer catastrophic failure if power is applied without a fluorescent lamp in its socket. This adverse phenomena cannot occur with the invention since with the lamp removed, the circuits of both FIG. 4 and FIG. 7 are open circuit and the action resonant stage cannot initiate resonant high-frequency operation.

The illustrated dimmable circuit at FIG. 11 can further be modified for use with a non-dimmable fluorescent lamp by replacing the variable resistor R6 with a fixed resistor (not shown). The value of the fixed resistor preferably continually biases this transistor Q3 off, allowing the application of maximum power to the fluorescent lamp. Alternatively, the entire dimming stage 56 can be removed from the circuit as discussed in association with FIG. 4, to reduce the overall cost of manufacturing the ballast circuit.

Remote Dimmer Control

Although the specific embodiments described above have been described with reference to the dimmable control ballast being located as an integral unit with the fluorescent lamp, the present invention can also be advantageously used as a remote dimmer control, e.g., used in a wall-mounted control unit. A particular advantage of the circuit of FIGS. 10 and 11 is that as shown, only two wires are needed to connect the remotely mounted ballast stage 40 and the fluorescent lamp 60.

Additional Embodiments of Dimmer Control

Figure 13:
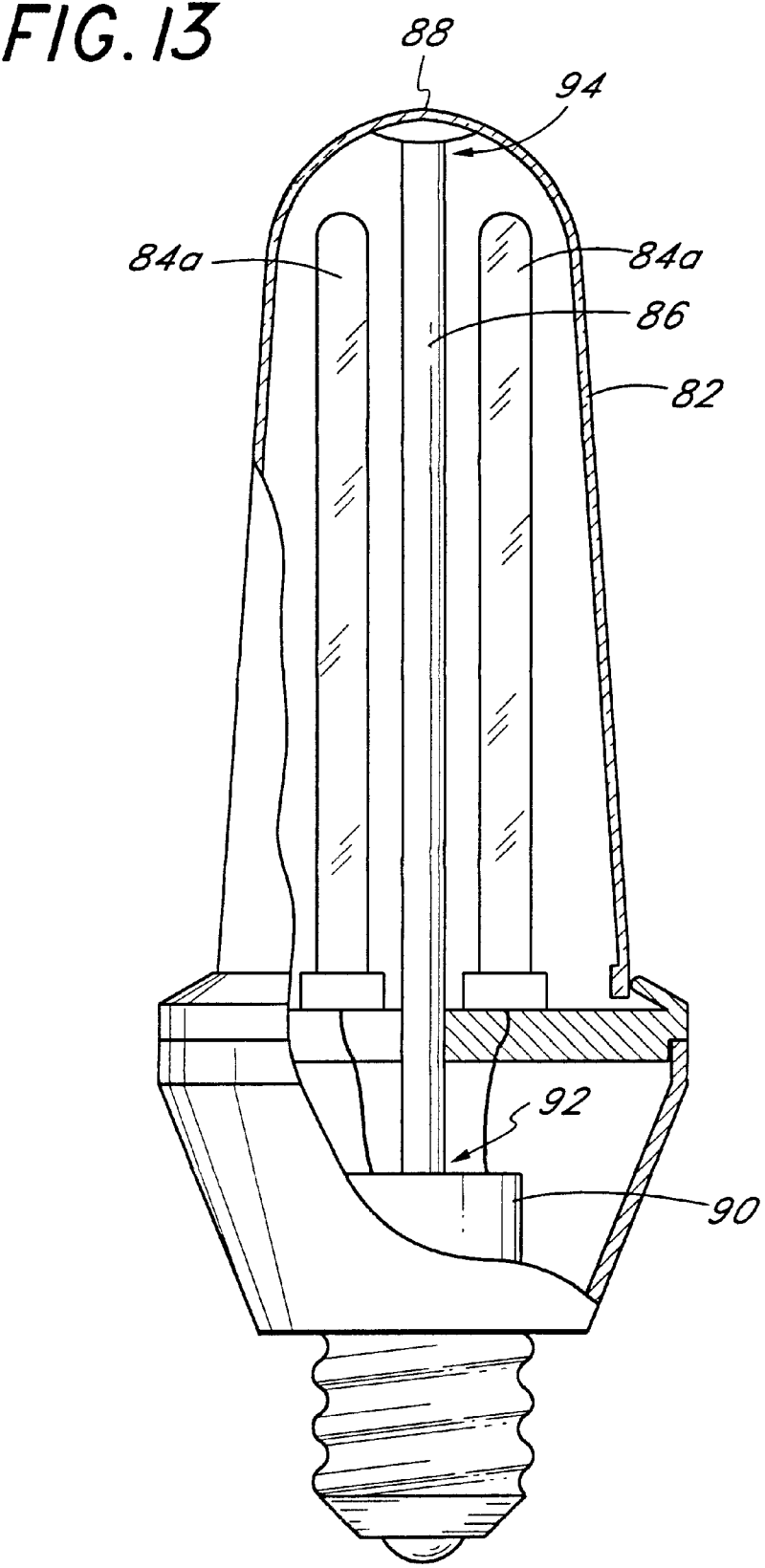
FIG. 13 is a partial sectional view of another embodiment of a dimmable compact screw-in fluorescent lamp apparatus.
Figure 14:
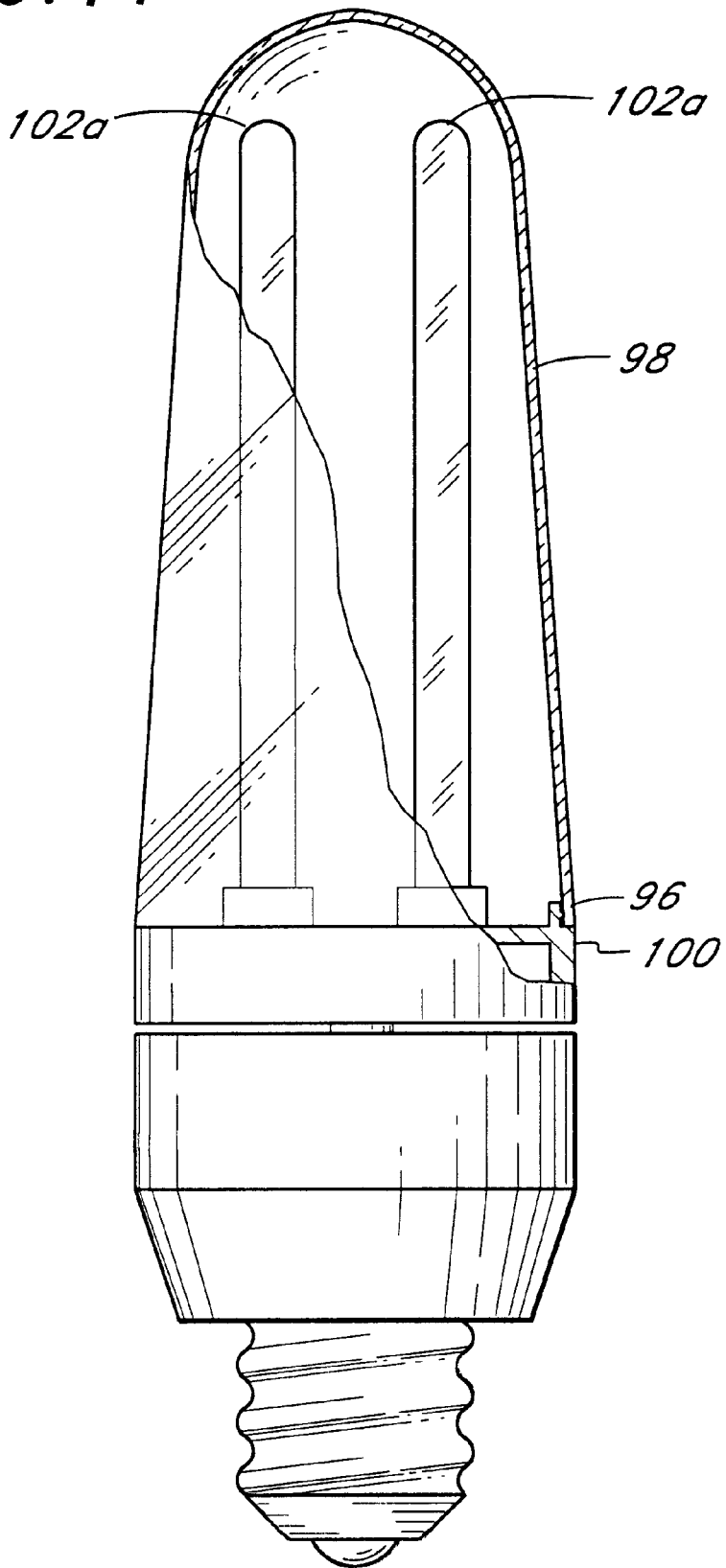
FIG. 14 is a partial sectional view of still another embodiment of a dimmable compact screw-in fluorescent lamp apparatus.

FIGS. 13 and 14 show two additional embodiments in which an external translucent globe 70 covers the fluorescent lamp tubes 71a. In both of these embodiments, rotation of the globe causes the fluorescent lamp to dim in one direction of rotation and becomes brighter in the opposite direction of rotation.

Referring to FIG. 13, the top end 75 of rod 72 is affixed to the inner apex 73 of the globe 70. The opposite bottom end of the rod extends to the ballast housing 74. In this embodiment, the housing exposes the control of variable resistor R6 of FIG. 11 and the bottom end of the rod 76 is attached to this control so that as the rod is rotated by rotating the globe 70 about the axis of the rod 72, the fluorescent tubes 71a are dimmed by rotation in one direction and became brighter by rotation in the opposite direction.

The lamp shown in FIG. 14 generally operates in the same manner as FIG. 13 but is structurally somewhat different. In this embodiment, the bottom end 79 of the translucent globe 80 engages by a friction clamp or otherwise an annular ring 81. This ring 81 in turn is connected to the variable resistor R6 of FIG. 11 so that when the globe 79 is rotated in one direction the fluorescent tubes 82a are dimmed and when the globe 79 is rotated in the opposite direction, the tubes 82a become brighter.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A ballast for a dimmable, screw-in compact fluorescent lamp, said ballast comprising:

an EMI filter stage connecting to line voltage;

a rectification and voltage doubler stage having an input connected to the output of said EMI filter stage;

a dimmer control;

a single active stage comprising a high frequency resonant circuit operating linearly, said resonant circuit comprising a first active element and a second active element, said resonant circuit connected to said dimmer control and to the output of said rectification and voltage doubler stage, said active stage producing an output having a first cycle portion and a second cycle portion, said dimmer control directly altering only said second active element to vary a duration of said second cycle portion; and first and second feedback paths, said first feedback path connecting a portion of the high frequency signal produced by said resonant circuit back to said EMI filter stage, said second feedback path connecting all frequency components of a current signal that is applied to said lamp back to said rectification and voltage doubler stage.

2. A ballast for a fluorescent lamp which provides a power factor to an input voltage line of 95% or higher, said ballast comprising:

a rectification stage energized by said input voltage line, said rectification stage comprising diodes rectifying the input line voltage, said diodes being driven substantially continuously in the conducting state including those periods when the input line voltage is below the threshold level of the diode;

a linearly operating high frequency resonant circuit having an input connection to the output of said rectification stage and an output coupled to said diodes; and first and second feedback paths, said first feedback path comprising a capacitor which connects a portion of the high frequency signal produced by said resonant circuit back to said EMI filter stage, said second feedback path connecting all frequency components of a current signal that is applied to said lamp back to said rectification and voltage doubler stage.

3. A ballast for providing a continuous dimming control over a fluorescent lamp, said ballast comprising:

an EMI filter stage connecting to line voltage;

a rectification and voltage doubler stage having an input connected to the output of said EMI filter stage, said rectification stage comprising diodes rectifying the input line voltage, said diodes being driven substantially continually in their conducting state including those periods when the input line voltage is below the threshold level of the diode;

a dimmer control;

an active, high frequency resonant circuit operating linearly, said resonant circuit comprising a first active element and a second active element, said resonant circuit connected to said dimmer control and to the output of said rectification and voltage doubler stage, said active circuit producing an output having a first cycle portion and a second cycle portion, said dimmer control directly altering only said second active element to vary a duration of said second cycle portion; and first and second feedback paths, said first feedback path connecting a portion of the high frequency signal produced by said resonant circuit back to said EMI filter stage, and said second feedback path connecting all frequency components of a current signal that is applied to said lamp back to said rectification and voltage doubler stage.

4. A ballast for providing a continuous dimming control over a fluorescent lamp including:
   a rectification stage having an input coupled to line voltage;
   a feedback capacitor connected in parallel with said line voltage;
   a dimmer control; and
   an active high frequency resonant circuit operating linearly, said resonant circuit comprising a first active element and a second active element, said high frequency resonant circuit connected to said dimmer control and to the output of said rectification stage, said active circuit producing an output having a first cycle portion and a second cycle portion, said dimmer control directly altering only said second active element to vary a duration of said second cycle portion.

5. A fluorescent lamp apparatus for connecting with at least one fluorescent lamp and with an input power source supplying an AC input voltage, said fluorescent lamp apparatus providing a variable brightness output of the lamp, said fluorescent lamp apparatus comprising:
   a rectification and voltage doubler stage, an input of said rectification and voltage doubler stage connecting to said input power source;
   an active resonant stage operating linearly, an input of the active resonant stage connected to an output of the rectification and voltage doubler stage and an output of the active resonant stage connected with said at least one fluorescent lamp, said active resonant stage further comprising:
      first and second switching transistors, each of said transistors having a base, an emitter and a collector; and
      a primary inductor associated with first and second secondary inductors, a first terminal of said primary inductor connected to the emitter of said first transistor and a second terminal of said primary inductor connected to a first end of said at least one fluorescent lamp, said first secondary inductor connected between the base and the emitter of said first switching transistor and said second secondary inductor connected between the base and emitter of said secondary switching transistor; and
   a dimmer control circuit to control only the operation of the second switching transistor to suppress the operation of the second switching transistor during a portion of the conductive cycle of the second switching transistor to provide a dimmed output of the fluorescent lamp, said dimmer control circuit connected to said active resonant circuit to thereby vary a duration of said conductive cycle.

6. A fluorescent lamp apparatus for connecting with at least one fluorescent lamp and with an input power source supplying an AC input voltage, said fluorescent lamp apparatus providing a variable brightness output of the lamp, said fluorescent lamp apparatus comprising:

a rectification and voltage doubler stage, said rectification and voltage doubler stage connected to said input power source;
an active resonant stage operating linearly, said active resonant stage connected to an output of the rectification and voltage doubler stage, said active resonant stage further comprising:
   first and second switching transistors, each of said transistors having a base, emitter and a collector;
   a freewheeling diode connected between the collector and emitter of each of said first and second switching transistors; and
   a primary inductor associated with first and second secondary inductors, a first end of said primary inductor connected to the emitter of said first transistor and a second end of said primary inductor connected to a first end of said at least one fluorescent lamp,
   said first secondary inductor connected between the base and the emitter of said first switching transistor and said second secondary inductor connected between the base and emitter of said secondary switching transistor; and
a dimmer control circuit to suppress the operation of only the second switching transistor during a portion of the conductive cycle of the second switching transistor to provide asymmetric operation producing a variable brightness output of the fluorescent lamp, said dimmer control circuit comprising:
   a dimming transistor connected between the base and emitter of said second switching transistor; and
   a variable resistor, a first end of said variable resistor is connected to the base and emitter of said dimming transistor and to the emitter of said second switching transistor and a second end of said variable resistor is connected to the base of the second switching transistor.

7. A fluorescent lamp apparatus for connecting at least one fluorescent lamp with an input power source, said input power source having a high voltage input line and a low voltage input line for supplying an AC input voltage, said fluorescent lamp apparatus comprising:
   rectification means for rectifying said A/C input voltage;
   resonant circuit means for generating a high frequency voltage in response to said rectified A/C input voltage for application to the at least one fluorescent lamp; and
   feedback means for feeding back a portion of the high frequency voltage that is applied to said at least one fluorescent lamp to the input of said rectification means to improve the power factor of said fluorescent lamp apparatus, said feedback means further feeding back a portion of the voltage that is applied to the at least one fluorescent lamp to the input of said rectification means, said low frequency voltage being fed back in parallel with a low frequency component of said AC input voltage.

8. The fluorescent lamp apparatus of claim 5, wherein the rectification means further comprises a voltage doubler for doubling said input A/C voltage.

9. A compact dimmable fluorescent lamp apparatus for connection with at least one fluorescent lamp and with an input power source supplying an AC input voltage, said AC input voltage being provided across first and second AC voltage rails, said fluorescent lamp apparatus comprising:
   rectification means for rectifying said AC input voltage;
   dimming means for generating a dimming signal indicative of lamp brightness; and a ballast circuit connected to said rectification means and said dimming means, said ballast circuit arranged for connection with the lamp for applying power variably to the lamp, said ballast circuit comprising:
   resonant circuit means for electrical connection with the lamp, said resonant circuit means operating linearly and generating a high frequency voltage in response to said input voltage, and further varying the level of power supplied to the lamp in response to said dimming signal, thereby attaining a selected level of lamp brightness; and
   first and second feedback means, said first feedback means connecting a portion of the high frequency signal produced by said resonant circuit means back to said first AC voltage rail, and said second feedback means connecting the signal components produced by said resonant circuit means back to said second AC voltage rail.

10. The compact dimmable fluorescent lamp apparatus according to claim 9, wherein said rectification means further comprises a voltage doubler for doubling said input voltage.

11. The compact dimmable fluorescent lamp apparatus according to claim 10, wherein said rectification means includes at least first and second diodes and at least first and second storage capacitors in circuit with said diodes.

12. The compact dimmable fluorescent lamp apparatus according to claim 9, wherein said resonant circuit means is a series resonant circuit.

13. The compact dimmable fluorescent lamp apparatus according to claim 9, wherein said resonant circuit means comprises:
   DC filtering means for filtering DC voltage components from said high frequency voltage; and
   lamp striking means for selectively actuating said fluorescent lamp.

14. The compact dimmable fluorescent lamp apparatus according to claim 13, wherein said DC filtering means includes a capacitive element, and wherein said lamp striking means is connected electrically in parallel with the lamp and includes a voltage storage capacitor.

15. The compact dimmable fluorescent lamp apparatus according to claim 9, wherein said ballast circuit further includes at least first and second semiconductor switching elements for alternatively conducting selected portions of said AC input voltage during operation of the lamp.

16. The compact dimmable fluorescent lamp apparatus according to claim 15, wherein said dimming means includes a third transistor, a storage capacitive element, and a manually variable resistance element, said manually variable resistance element connected to said storage capacitive element, said storage capacitive element being connected to a controlling input of said third transistor, said third transistor in turn being connected to an input of said second semiconductor switching elements such that said manually variable resistance element controls a switching time of said second semiconductor element to selectively determine an illumination brightness level of said lamp.

17. The compact dimmable fluorescent lamp apparatus according to claim 16, wherein a charge on said capacitive element is responsive to said manually variable resistance element, said charge applied to said third transistor to control conduction of said third transistor.

18. The compact dimmable fluorescent lamp apparatus according to claim 17, wherein each of said first and second switching elements has a normal conduction interval, and wherein said charge applied to said third transistor controls said third transistor to thereby terminate said normal conduction of one of said first and second transistors prior to said normal conduction interval.

19. The compact dimmable fluorescent lamp apparatus according to claim 9, further comprising filter means for filtering high frequency noise components generated by said resonant circuit to prevent leakage of said noise into said input power source, and for filtering electromagnetic interference from said input power source.

20. The compact dimmable fluorescent lamp apparatus according to claim 16, wherein said dimming means further comprises a circuit by-pass means connected to said controlling input of said third transistor, said circuit by-pass means allowing a current to electrically by-pass said variable resistor during start-up operation of said lamp.

21. The compact dimmable fluorescent lamp apparatus according to claim 20, wherein said circuit by-pass means comprises a zener diode connected to said controlling input of said third transistor.

22. The compact dimmable fluorescent lamp apparatus according to claim 9, wherein said voltage feedback means comprises a capacitive element for storing a selected voltage level at least substantially equal to said input voltage.

23. The compact dimmable fluorescent lamp apparatus according to claim 11, wherein said voltage feedback means further includes conduction angle expansion means for expanding the conduction angle of said diodes.

24. The compact dimmable fluorescent lamp apparatus according to claim 9, wherein said voltage feedback means further comprises power factor correction means for correcting said power factor of said input voltage.

25. A fluorescent lamp apparatus for connection to an AC input voltage and to at least one fluorescent lamp, said lamp apparatus comprising:
   rectification means for generating a rectified voltage responsive to said AC input voltage;
   voltage doubler means for amplifying said rectified voltage; and
   ballast circuit means in circuit with said rectification means and said voltage doubler means and arranged for connection with the lamp for applying power variably thereto, said ballast circuit means including:
      resonant circuit means for generating a high frequency voltage in response to said rectified voltage; and
      voltage feedback means, in electrical communication with said resonant circuit means and said rectification means, for generating a selected high frequency voltage signal, whereby said high frequency voltage signal is superimposed over said AC input voltage, said voltage feedback means further providing a high frequency feedback voltage in parallel with said AC input voltage.

26. The fluorescent lamp apparatus according to claim 25, further including dimming means for generating a dimming signal indicative of a selected level of lamp brightness, and wherein said resonant circuit means, in circuit with said dimming means, varies the level of power supplied to the lamp in response to said dimming signal for attaining a selected level of lamp brightness.

27. The fluorescent lamp apparatus according to claim 25, wherein said resonant circuit means is a series resonant circuit.

28. The fluorescent lamp apparatus according to claim 25, wherein said resonant circuit means comprises:
   defiltering means for filtering DC voltage components from said high frequency voltage; and
   lamp striking means for actuating the fluorescent lamp.

29. The fluorescent lamp apparatus according to claim 27, wherein said ballast circuit further includes at least first and second semiconductor switching elements for alternately conducting during selected portions of said AC input voltage during operation of the lamp.

30. The fluorescent lamp apparatus according to claim 29, wherein said dimming means includes a third transistor connected to a controlling input of said second semiconductor switching element, a manually variable resistive element electrically connected to said third transistor, and at least one capacitive element connected to said third transistor, a setting on said manually variable resistive element determining selectively a voltage stored within said capacitive element, said voltage stored with said capacitive element controlling a relative conduction state of said third transistor.

31. The fluorescent lamp apparatus according to claim 30, wherein said first and second switching elements have respective normal conduction intervals, and wherein when said third transistor conducts, said third transistor conducts a current which terminates said conduction of one of said first and second transistors prior to an end of said normal conduction interval of said one of said first and second transistors.

32. Fluorescent lamp apparatus according to claim 25, wherein said voltage feedback means comprises a capacitive element for storing a selected voltage level at least substantially equal to said input voltage.

33. Fluorescent lamp apparatus according to claim 25, wherein said rectification means includes first and second diodes having an associated conduction angle, and wherein said voltage feedback means further includes conduction angle expansion means for expanding the conduction angle of at least one of said first and second diodes.

34. Fluorescent lamp apparatus according to claim 25, wherein said voltage feedback means further comprises power factor correction means for correcting said power factor of said input voltage.

35. A ballast circuit apparatus for connection with a dimmable compact fluorescent lamp mounting one or more fluorescent lamps and for connection with an AC input voltage, said circuit apparatus comprising:

rectification means for rectifying said AC input voltage;

first and second semiconductor switching means in electrical communication with said rectification means and each having a selected normal conduction interval, wherein said normal conduction interval of said first switching means is substantially opposite to that of said second switching means;

a linearly operating series resonant circuit in circuit with said rectification means and said first and second switching means for generating a high frequency voltage in response to said input voltage;

voltage feedback means electrically connected to said resonant circuit for feeding back to said rectification means said selected high frequency voltage at a selected elevated voltage level at least substantially equal to said input voltage, said voltage feedback means connected in parallel with said AC input voltage;

circuit starter means in electrical communication with one of said first and second switching means for selectively actuating said switching means; and dimming control means in electrical communication with at least one of said first and second switching means for adjusting variably said brightness levels of the lamp.

36. The ballast circuit apparatus according to claim 35, further comprising voltage amplification means for amplifying said rectified voltage.

37. The ballast circuit apparatus according to claim 35, further comprising filter means electrically connected to said input voltage and said reflection means, said filter means filtering electromagnetic interference from said input voltage.

38. The ballast circuit apparatus according to claim 35, wherein said dimming control means includes a manually variable resistive element connected to a control input of a transistor, said transistor connected to one of said first or second switching means to adjust variably the lamp brightness level.

39. The ballast circuit apparatus according to claim 38, wherein said transistor has a conduction state such that when said transistor is in said conduction state a current flows through said transistor, said current prematurely terminating a normal conduction interval of one of said first and second switching means to selectively decrease power supplied to the lamp, thereby adjusting the lamp brightness level.

40. The ballast circuit apparatus according to claim 35, wherein said feedback means is adapted to provide power factor correction of said input voltage.

* * * * *